US012762132B1

(12) United States Patent
Yates

(10) Patent No.: US 12,762,132 B1
(45) Date of Patent: Oct. 13, 2026

(54) GENERATING EXTRACT CONTENT ITEMS UTILIZING AN EXTRACTOR MODEL

(71) Applicant: Dropbox, Inc., San Francisco, CA (US)

(72) Inventor: Andrew Donald Yates, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/413,530

(22) Filed: Dec. 9, 2025

(51) Int. Cl.
*G06F 16/2457* (2019.01)
*G06F 16/23* (2019.01)
*G06F 16/28* (2019.01)

(52) U.S. Cl.
CPC .... *G06F 16/24578* (2019.01); *G06F 16/2358* (2019.01); *G06F 16/282* (2019.01)

(58) Field of Classification Search
None
See application file for complete search history.

(56) References Cited

U.S. PATENT DOCUMENTS 4,975,961 A * 12/1990 Sakoe .................. G06N 3/04 704/E15.017
7,209,914 B2 4/2007 Van Heghe et al.
8,117,535 B2 2/2012 Beyer et al.
8,392,543 B1 * 3/2013 Singh .................. H04L 67/1095 709/221
8,473,532 B1 * 6/2013 Ben .................. G06F 16/13 707/831
8,676,835 B2 3/2014 Bartholomew
8,924,395 B2 12/2014 Wade et al.
11,132,421 B1 * 9/2021 Wang .................. G06F 16/951
11,594,054 B2 2/2023 Walters et al.
11,809,355 B2 11/2023 Nguyen et al.
2002/0194151 A1 * 12/2002 Fenton .................. G06F 16/958
2004/0078188 A1 * 4/2004 Gibbon .................. G06F 16/739 704/1
2005/0108215 A1 * 5/2005 Thomas .................. G06F 16/58 707/E17.031
2010/0306197 A1 * 12/2010 Jin .................. G06F 16/583 707/769
2011/0276562 A1 * 11/2011 Madden-Woods .................. G06F 16/9038 707/E17.014
2012/0079380 A1 * 3/2012 Tsai .................. G06F 16/78 715/716

(Continued)

*Primary Examiner* — Irene Baker
(74) *Attorney, Agent, or Firm* — Keller Preece PLLC

(57) ABSTRACT

The present disclosure relates to methods, systems, and non-transitory computer-readable media for recursively generating extract content items from a content item. Specifically, the disclosed systems can identify a content item and generate a hierarchy of extract content items, recursively adding each layer in the hierarchy by breaking the content of previously generated extract content items down into increasingly primitive segments. The extract content items include lineage metadata that indicates extract lineage generation-by-generation (for each iteration in the recursive process) all the way back to an originating content item. In some instances, the disclosed systems generate a hierarchical extract structure (represents the lineage of extract content items through generations), provides the structure for display on a client device, shares the structure with one or more user accounts, and/or provides the structure to one or more generative models to utilize in answering user queries.

20 Claims, 11 Drawing Sheets

(56) References Cited

U.S. PATENT DOCUMENTS

| | | | | |
|---|---|---|---|---|
| 2012/0310868 | A1 | 12/2012 | Martins | |
| 2014/0089324 | A1 | 3/2014 | Ellsworth et al. | |
| 2020/0012862 | A1* | 1/2020 | Mitra | G06N 3/09 |
| 2022/0027316 | A1 | 1/2022 | Deluca et al. | |
| 2022/0198211 | A1 | 6/2022 | Ferreira Moreno et al. | |
| 2023/0315799 | A1* | 10/2023 | Belhe | G06V 30/41<br>715/206 |
| 2023/0325458 | A1* | 10/2023 | Gursha | G06F 16/958 |
| 2024/0012797 | A1* | 1/2024 | Jagasia | G06F 16/219 |
| 2024/0202225 | A1* | 6/2024 | Siebel | G06N 20/00 |
| 2025/0265303 | A1* | 8/2025 | Li | G06F 16/9577 |

* cited by examiner

GENERATING EXTRACT CONTENT ITEMS UTILIZING AN EXTRACTOR MODEL

BACKGROUND

In the field of cloud-based digital content management, recent years have seen significant developments in simplifying storage architectures and processing content data. Existing systems can, for example, derive data from source content items or media files for performing functions such as searches or response generation. However, these systems commonly rely on external storage services or third-party cloud platforms to derive data and perform various functions (e.g., searching and response generation), requiring transfer of media across distributed infrastructures. Existing systems therefore exhibit a number of deficiencies or drawbacks, particularly relating to efficiency, security, and flexibility.

As just suggested, some existing systems are slow and inefficient. For example, many conventional systems are implemented across distributed infrastructures that require uploading and hosting content items in external services separate from other systems or services that perform functions such as searching and response generation. This architecture introduces significant data transfer overhead and latency during both retrieval and response operations. In addition, because such systems often reprocess the same source content (e.g., reprocessing content items in their entireties) across different tools or user accounts, redundant processing cycles occur, resulting in unnecessary consumption of computational resources and increased storage costs.

Existing systems also exhibit deficiencies in security and accuracy. For instance, existing systems frequently export derived data from original environments to store as independent content items, separate from their source content items. As a result, the derived data (e.g., permissions, retentions, and other data) often becomes disassociated from the source content. This fragmented model prevents accurate tracking of data relative to content items, leading to opaque governance and uncertainty regarding permissions, versioning, or other data-driven aspects of content items. Moreover, sharing a content item together with its associated derived data is cumbersome and prone to versioning errors during subsequent editing or processing operations.

In addition, existing systems are frequently operationally inflexible. For example, many conventional services operate as siloed applications that handle only specific content types and formats. When integrated with broader enterprise workflows, these services often depend on proprietary storage interfaces or one-off APIs, making it cumbersome to consolidate derived data from multiple sources. Moreover, because such systems are not designed to natively manage files across diverse connectors or content platforms, they frequently provide only limited mechanisms for generating, viewing, updating, or otherwise managing content items and derived data. For instance, such limitations often restrict generating, access, and editing capabilities to specific types of content items.

SUMMARY

This disclosure describes one or more embodiments of methods, systems, and non-transitory computer-readable storage media that provide benefits and/or solve one or more of the foregoing and other problems in the art. For instance, the disclosed systems can recursively generate extract content items from a source content item. Specifically, the disclosed systems can identify a content item (e.g., in a content management system) and generate a hierarchy of extract content items, recursively adding each layer in the hierarchy by breaking the content of previously generated extracts down into increasingly primitive or simple segments. The extract content items include lineage metadata that indicates extract lineage generation-by-generation (for each iteration in the recursive process) all the way back to an originating content item. Further, the disclosed systems can store originating content items, extract content items, and lineage metadata in a persistent storage location of the content management system. In some instances, the disclosed systems generates a hierarchical extract structure (that represents the lineage of extract content items through generations), provides the structure for display on a client device, shares the structure with one or more user accounts, and/or provides the structure to one or more generative models to utilize in answering user queries. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

This disclosure describes one or more embodiments of an extract generation system that can recursively generate extract content items from a source content item. For instance, the extract generation system can recursively generate extract content items from a source content item, further breaking down and simplifying the data from iteration to iteration, until reaching a threshold primitive level. For example, starting from a source content item (e.g., a multimedia file), the extract generation system can utilize one or more extractor models to generate a hierarchy of one or more extract content items, recursively adding each layer in the hierarchy by breaking the content of previously generated extract content items down into more and more primitive or simple segments or extract types (with more, simpler items at each layer or generation). The extract generation system can also determine (from each extract content item) lineage metadata that indicates extract lineage from the source content item (e.g., indicating its path through the hierarchy). Further, the extract generation system can store the content item, extract content items, and the lineage metadata in a persistent storage location—such as in a shared extract lineage folder within the persistent storage location—of the content management system.

In some instances, the extract generation system generates a hierarchical extract structure that includes the content item, one or more extract content items, and/or the lineage metadata. The extract generation system can provide the hierarchical extract structure for display on a client device, shares the hierarchical extract structure with one or more user accounts, and/or provide the hierarchical extract structure to one or more generative models (e.g., large language models or "LLMs") to utilize in answering user queries, performing searches, or executing agentic tasks. In at least one embodiment, the extract generation system can utilize a detector model to monitor the content management system to detect a modification to the content item and/or to one or more extract content items, and propagate the modification(s) accordingly.

Figure 1:
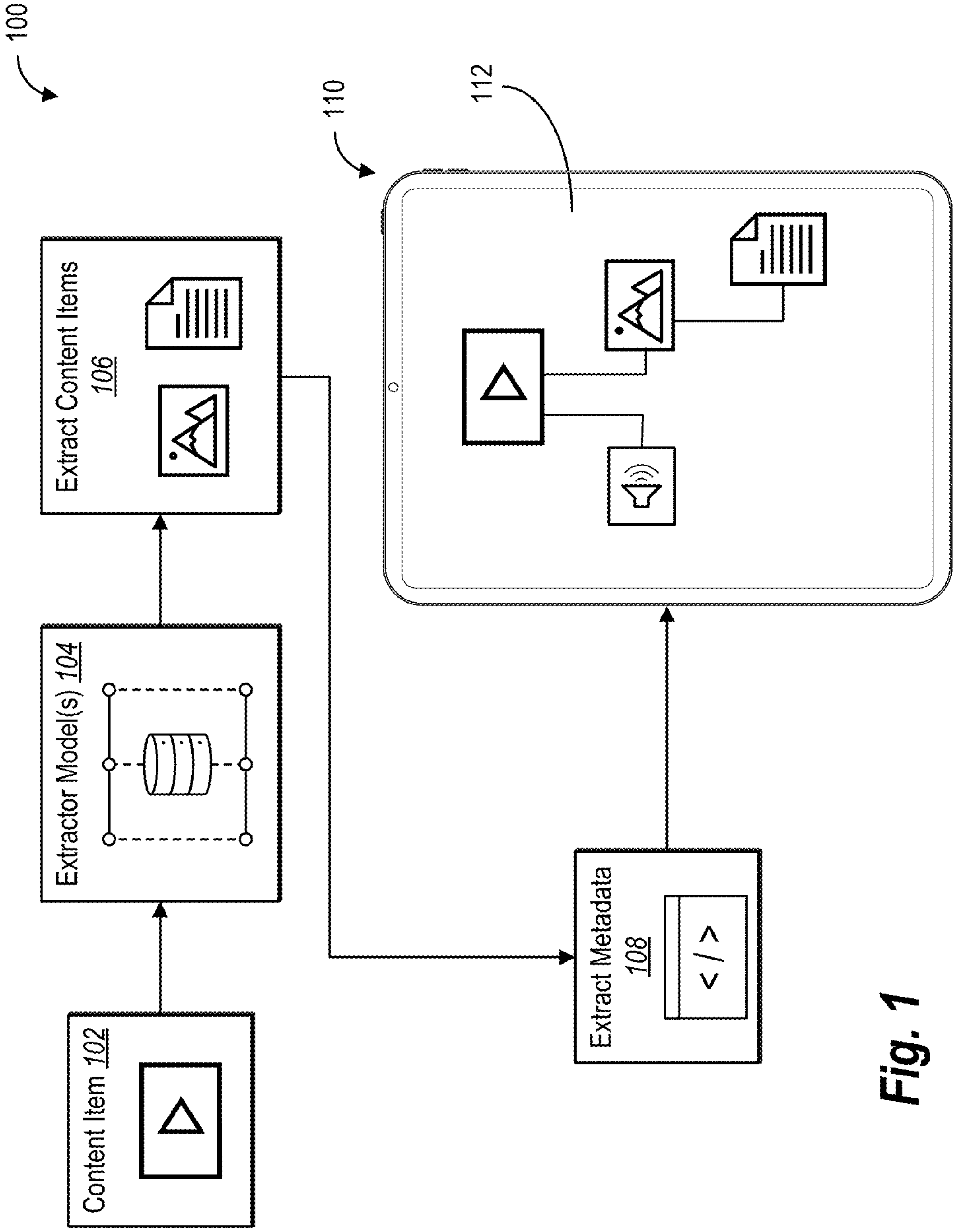
FIG. 1 illustrates an example overview of generating one or more extracted content items from a content item, determining extract metadata, and providing the one or more extracted content items and the extract metadata for display on a client device in accordance with one or more embodiments.

Additional detail regarding an extract generation system 100 will now be provided with reference to the figures. For example, FIG. 1 illustrates an example overview of generating one or more extracted content items from a source content item, determining extract metadata, and providing the one or more extracted content items and the extract metadata for display on a client device in accordance with one or more embodiments. Additional detail regarding the various acts and processes introduced in relation to FIG. 1 is provided thereafter with reference to subsequent figures.

As illustrated in FIG. 1, the extract generation system 100 identifies a content item 102. For example, the extract generation system 100 can identify the content item 102 stored at a content management system. In some embodiments, the content item 102 is or includes a multimedia content item (e.g., a file or some other complex filetype) that can include one or more primitive content types included within it. For instance, a video file includes multiple images and audio. The audio, in turn, includes volume data, background noise data, music data, and/or transcript data. Similarly, the images may include data indicating objects or scenes depicted, including locations or placements of the objects.

As also illustrated in FIG. 1, the extract generation system 100 utilizes one or more extractor models 104 to generate or extract one or more extract content items 106 from a content item 102. To elaborate, the extract generation system 100 can identify the content item 102 from a content management system. Additionally, the extract generation system 100 can utilize an extract categorizer (e.g., a machine learning model, such as a regression classifier, a trained neural network, or an LLM) to determine a content type or extract type corresponding to the content item 102. In some cases, the extract categorizer analyzes data within the content item 102 to determine types of content are extractable from the content item 102. Based on using the extract categorizer, the extract generation system 100 can determine an extractor model from the one or more extractor models 104 that corresponds to the content type of the content item 102. Using the determined extractor model, the extract generation system 100 can generate or extract an extract content item from the content item 102. For example, if the content item 102 is a video content item, the extract generation system 100 may extract an image content item and an audio content item from the video content item.

In at least one embodiment, the extract generation system 100 recursively generates one or more additional extract content items. For instance, extract generation system 100 can recursively generate extract content items until reaching a threshold primitive level. To illustrate, the extract generation system can utilize the one or more extractor models 104 to recursively break the content of previously generated extract content items down into more and more primitive segments, adding new layers for each iteration of extraction (e.g., until an extract content item reaches a primitive or rudimentary level). As an example, if the extract content item generated from the content item 102 is an image content item, the extract generation system 100 may then generate an additional extract content item, such as a textual content item, from the image content item. Through this recursive process, the extract generation system 100 generates a hierarchical extract structure that includes nodes and edges, starting from a root node representing the source content item and expanding with an additional node for each extract content item, where the edges connecting the nodes represent the content item from which an extract content item is extracted.

As additionally illustrated in FIG. 1, the extract generation system 100 determines extract metadata 108 from the one or more extract content items 106. For instance, the extract generation system 100 can determine (as part of the recursive extraction process) extract metadata 108 that includes lineage metadata. To elaborate, the lineage metadata may indicate extract lineage from the content item 102 to the one or more extract content items 106, following the path of edges between nodes where extraction occurred to generate each respective extract content item. In some embodiments, the extract lineage can provide a lineage from a most primitive or simple extract content item back to the content item 102. In some instances, the extract generation system 100 can organize the lineage metadata into a lineage data representation (e.g., a metadata table or a metadata graph) that defines the extract lineage. In the same or other embodiments, the extract metadata 108 additionally or alternatively includes governance metadata and/or action inheritance metadata.

In some embodiments, the extract generation system 100 stores the one or more extract content items 106 and/or the extract metadata 108 in a persistent storage location within the content management system. For instance, the extract generation system 100 can store the one or more extract content items 106 and/or the extract metadata 108 within a shared extract lineage folder within the persistent storage location. The persistent storage location is described in greater detail below (e.g., in relation to FIG. 3).

Further, as illustrated in FIG. 1, the extract generation system 100 provides the extract metadata 108 with the one or more extractor models 104 for display on a client device 110 associated with the content management system. In particular, the extract generation system 100 can generate hierarchical extract structure that can include the extract metadata 108 (including, in some cases, the lineage data representation) with the content item 102 and/or the one or more extract content items 106 for display in a user interface 112 of the client device 110. Moreover, the extract generation system can provide one or more elements for display in the client device that are selectable to manage the content item 102, the one or more extract content items, and/or the extract metadata 108. These elements are described in greater detail below (e.g., in relation to FIGS. 6-7).

In some embodiments, the extract generation system 100 utilizes a generative model (e.g., a lineage analysis model powered by an LLM or other generative architecture) to generate a generative response to a user query. For instance, in response to receiving a user query (e.g., from the client device 110), the extract generation system 100 can utilize the generative model to generate the generative response to the user query based on the hierarchical extract structure. Utilizing the generative model to generate a generative response is described in greater detail below (e.g., in relation to FIG. 5).

In at least one embodiment, the extract generation system can utilize a detector model to monitor the content management system to detect a modification to the content item 102 and/or to one or more extract content items 106. For example, in response to detecting a modification to a content item 102, the extract generation system can propagate the modification by modifying one or more extract content items to reflect the modification to the content item 102. Additionally or alternatively, in response to detecting a modification to an extract content item, the extract generation system can modify one or more parameters of one or more extractor models based on the modification to the extract content item. These concepts are described in greater detail below (e.g., in relation to FIG. 4).

In one or more embodiments, the extract generation system 100 can provide several improvements or advantages over existing systems. For instance, the extract generation system 100 can improve speed and efficiency relative to existing systems. To elaborate, the extract generation system 100 can automatically (e.g., without a user interaction) generate one or more extract content items from a content item and store the one or more extract content items in a persistent storage location within a content management system (e.g., that can include the extract generation system 100).

Indeed, rather than uploading and hosting content items in separate external services, the extract generation system 100 can generate and store a hierarchical extract structure that includes the original content item and/or the one or more extract content items (along with corresponding extract metadata) in a shared extract lineage folder within the persistent storage location. Consequently, the extract generation system 100 limits overhead and latency issues by reducing transmission of data to and from third-party systems located at servers external to the content management system and reducing reprocessing the same content item across different tools or user accounts. Further, by reducing (or eliminating) the need to store extract content items at such third-party systems, the extract generation system 100 can also reduce processing and storage costs associated with the third-party systems and improve scalability. Moreover, the extract generation system 100 can utilize extract content items that are pre-computed so they can (always) be ready for use by user accounts and by generative models, further reducing time and resource consumption.

Additionally, using this persistent storage location, the extract generation system 100 can quickly and efficiently access hierarchical extract structures and utilize them for one or more operations. For instance, the extract generation system 100 can provide a hierarchical extract structure for display on a client device and/or share a hierarchical extract structure with one or more user accounts, thereby limiting consumption of time and computing resources that would otherwise be required to locate a source content item associated from a particular extract content item and/or one or more extract content items stemming from a particular source content item. By using the persistent storage location and hierarchical extract structures, the extract generation system 100 can also enable quick access and modification of a plurality of content items or extract content items. For instance, in response to detecting a modification, the extract generation system 100 can rapidly propagate modifications between content items or extract content items in a hierarchical extract structure and/or rapidly synchronize content items or extract content items between client devices to maintain revisions.

Furthermore, the extract generation system 100 can identify (e.g., utilizing a machine learning model, such as a generative model) and select at least one extract content item from a hierarchical extract structure that satisfies a relevance threshold. In some instances, the extract generation system 100 utilizes the at least one extract content item to generate a generative response to a user query instead of using larger source content items that include complex multimedia files that take up large numbers of model tokens. Because extract content items are smaller (e.g., using fewer tokens) and less computationally expensive to process than entire content items, the extract generation system 100 can save time and computing resources by intelligently selecting, uploading, and/or processing extract content items. This advantage is described in greater detail below (e.g., in relation to FIG. 5).

The extract generation system 100 can also improve security and accuracy. For instance, as mentioned above, existing systems frequently store derived data separately from their source content items, resulting in the derived data (e.g., including permissions, retentions, and other data) often becoming disassociated from the source content item. By contrast, the extract generation system 100 can determine extract metadata from one or more extract content items and store the extract metadata with the one or more extract content items within the persistent storage location (e.g., as hierarchical extract structures).

In some embodiments, the extract metadata includes lineage metadata and/or action inheritance metadata, thereby enabling the extract generation system 100 to maintain tracking of each extract content item and its source content item(s) from which an extract was generated, along with any actions (e.g., modifications) made to a content item or extract content item. Thus, the extract generation system 100 can maintain an accurate record of the extract lineage while ensuring that a content item and any extract content items accurately reflect the most current and up-to-date version. Further, the extract metadata can include governance metadata that enables the extract generation system 100 to persistently maintain data governance rules—such as permission rules (e.g., access control lists or ACLs) or retention rules (e.g., specifying how long data may be kept)—for each extract content item. As a result, the extract generation system 100 improves security and data integrity by ensuring that data governance rules remain consistently enforceable across related extract content items and their source content item.

In addition to the above, the extract generation system 100 can improve flexibility. For instance, rather than operating as siloed applications that handle only specific content types and formats, the extract generation system 100 can utilize a unified architecture to generate, access, and/or manage various types of extract content items. In some embodiments, the extract generation system 100 includes or utilizes one or more extractor models configured to generate extract content items from content items of differing extract types. For example, the extract generation system 100 can generate extract content items based on content items of a various extract types, including a video type, audio type, image type, digital document type, or other media type. Accordingly, the extract generation system 100 can enable consistent processing and management of heterogeneous content within a single system environment.

Moreover, unlike many existing systems that are unable to process certain types of data, the extract generation system 100 can flexibly enable processing such data types using extract content items. To elaborate, many existing systems rely on native files that are not only large and slow to process but that also often include uninterpretable data (e.g., Photoshop files), resulting in less reliable (or faulty) search and response results. By contrast, the extract generation system 100 can automatically generate extract content items from such native files, use a generative model to determine which extract content items are relevant (e.g., based on the extract lineage to the attached native file and/or its internal contents), and process the relevant extract content items for generating a response.

Further, in part due to the unified architecture, the extract generation system 100 can also improve user account flexibility in generating, viewing, updating, or otherwise managing extract content items. In contrast with existing systems that frequently provide only limited mechanisms for such operations, the extract generation system 100 generates and provides a user interface for display in a client device that enables flexible management of extract content items. For example, the extract generation system 100 can provide one or more hierarchical extract structures for display, along with one or more elements selectable to view, edit, hide, disable/enable, share, and/or visualize a version history of a content item and/or extract content item. In the same or other embodiments, the extract generation system 100 provides one or more elements selectable to define one or more extractor rules for managing the generation of extract content items. Moreover, in response to detecting a modification to a content item or extract content item, the extract generation system 100 can automatically propagate the modification to any extract content items generated from the modified content item and/or modify one or more parameters of an extractor model to incorporate the modifications in one or more future extractions.

As illustrated by the foregoing discussion, the present disclosure utilizes a variety of terms to describe features and advantages of the extract generation system 100. Additional detail is now provided regarding the meaning of such terms. As used herein, the term "content item" refers to a digital object or data entity that includes information, data, and/or media. In particular, a content item can include structured or unstructured digital data in any format suitable for processing, storage, and/or analysis. For example, a content item can include a digital document or text, digital image, digital video, audio recording, data structure, dataset, calendar or calendar item, webpage, email, or other digital file, or any portion, representation, or derivative thereof. In some instances, a content item can be a source (or original) content item from which an extract content item can be generated.

Relatedly, as used herein, the term "extract content item" refers to a content item generated, extracted, derived, and/or obtained from another content item. In particular, an extract content item can include a content item produced by processing, analyzing, or transforming a source content item to isolate or represent a subset, feature, or characteristic of the source content. For example, an extract content item can include a more primitive data structure than the content item from which it is extract, such as a transcript derived from an audio or video file, keyframes and/or shot maps determined from a video file, scene detection from a video file or digital image, a table extracted from a document or digital image, text identified through optical character recognition or from a PDF, summaries of and/or candidate titles for a text document, chunks (e.g., snippets) of a text document, image or a reduced-size version (e.g., thumbnail) extraction from a slide presentation, language translations (e.g., a text or audio file translation from Chinese into English), an embedding transformation, and/or any other derivative representation or output generated from a content item. Extract content items are editable, shareable, searchable, chattable, auditable, and versioned. Extract content items inherit actions done to predecessor content items (e.g., source content items or other extract content items from which other extract content items are extracted)—the extract generation system 100 automatically propagates the actions to the extract content items, such as moves, copies, modifications, and deletes. In some cases, the extract generation system 100 precomputes extract content items (e.g., recursively generating a full extract structure for each content item upon upload or ingestion in the content management system) so they are always ready for use in downstream processes.

As also used herein, the term "extract categorizer" refers to one or more computational models, algorithms, or processing components configured to determine or select an extract model for a content item or extract content item. In particular, an extract categorizer can determine an extract type for a particular content item or extract content item and determine or select an extractor model to generate an extract content item from the content item or extract content item according to the extract type. In some embodiments, an extract categorizer corresponds to or includes a machine learning model, such as a neural network or a large language model (LLM).

Along these lines, as used herein, the term "extractor model" refers to one or more computational models, algorithms, or processing components configured to generate one or more extract content items from a content item. In particular, an extractor model can include a machine learning model (e.g., a generative model), rule-based engine, heuristics model, computer script, or other programmatic process that analyzes a content item of a particular extract type to identify, segment, and/or derive data elements, features, or representations therefrom. For example, an extractor model can include an optical character recognition (OCR) model configured to extract text from an image or document, a speech-to-text model configured to extract transcripts from audio or video content, a computer vision model configured to identify objects or scenes within image or video content, a or a natural language processing model configured to extract structured data or metadata from textual (e.g., unstructured) content.

Additionally, as used herein, the term "extract type" (or "content type") refers to a classification or category that characterizes the form, structure, modality, or data domain of a content item or extract content item. For example, an extract type can include a video type, audio type, image type, digital document (or digital text) type, data structure type (e.g., a table or chart), a calendar type, tabular type, a webpage type, translation type, embedding type, condensing type (e.g., summaries and/or candidate titles), code block type, function type, binary type, or other data or media type.

Moreover, as used herein, the term "detector model" refers to one or more computational models, algorithms, or processing components configured to identify or recognize modifications, changes, events, or conditions associated with one or more content items or extract content items. For instance, a detector model can monitor data, metadata, or system activity within a content management system to detect modifications (e.g., edits), updates, or other state changes to stored content.

As further used herein, the term "generative model" refers to one or more machine learning models that are configured to generate new data samples that are statistically consistent with the data on which the model was trained. Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs. For instance, a generative model can include a lineage analysis model configured to analyze one or more hierarchical extract structures and to generate a generative response to a user query utilizing one or more components (e.g., a content item, one or more extract content items, and/or extract metadata) of the hierarchical extract structures. In some instances, a generative model (and/or lineage analysis model) can correspond to or include a machine learning model, such as a neural network or LLM.

As used herein, the term "machine learning model" refers to one or more computer-implemented models that are tunable (e.g., trainable) based on inputs to approximate unknown functions. In particular, a machine learning model can refer to a model that uses algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), association rule learning, inductive logic programming, support vector learning, Bayesian network, regression-based model (e.g., censored regression), principal component analysis, or a combination thereof.

Relatedly, as used herein, the term "neural network" refers to one or more models of interconnected artificial neurons (e.g., organized in layers) that communicate and learn to approximate complex functions and generate outputs based on inputs provided to the model. In particular, a neural network can refer to one or more machine learning algorithms. In some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial network, a large language model, a graph neural network, a multi-layer perceptron, or a diffusion neural network. In some embodiments, a neural network includes a combination of neural networks or neural network components.

Along these lines, as used herein, the term "large language model" (or "LLM") refers to one or more computer-implemented machine learning models trained to comprehend and generate human language text. In particular, a large language model can refer to a neural network (e.g., a deep neural network) with many parameters trained on large quantities of data (e.g., unlabeled text) using a particular learning technique (e.g., self-supervised learning) using an architecture (e.g., a deep neural network architecture) such as a transformer-based architecture. For example, in some cases, a large language model includes parameters trained to generate natural language text output from natural language text input. For instance, a large language model can generate natural language text output that provides informational responses to a natural language text input having a query (and/or one or more constraints). In some cases, a large language model implements a deep transformer neural network architecture. Some examples of large language models include, but are not limited to, chat generative pre-trained transformer (Chat GPT), Gemini, and Large Language Model Meta AI (LLaMA).

As used herein, the term "extract metadata" refers to information or data that describes, characterizes, or provides contextual details about an extract content item. In particular, extract metadata can include properties generated or maintained to identify relationships between an extract content item and its source content item, as well as operational, structural, or governance information associated with the extract. For example, extract metadata can include lineage metadata that indicates an extract lineage from a content item or an extract content item to a downstream extract content item, governance metadata that indicates data governance rules associated with a content item and/or one or more extract content items, and/or action inheritance metadata that indicates any actions or modifications made to a content item and/or to one or more extract content items.

Along these lines, as used herein, the term "lineage metadata" refers to information or data (e.g., a type of extract metadata) that indicates extract lineage for one or more content items and/or extract content items. In particular, lineage metadata can identify relationships among content items, extract content items, and/or intermediate processing operations, thereby enabling traceability of how data was generated, modified, or utilized. For example, lineage metadata can include identifiers or references linking an extract content item to a corresponding source content item and/or other extract content item from which it was derived, timestamps or version identifiers indicating creation or modification events, and/or records describing processing parameters, applied models, or other operations that produced or altered the extract content item.

As also used herein, the term "extract lineage" refers to a chain of inheritance of content items and extract content items. In particular, an extract lineage can include an origin, derivation, or transformation (or extraction) history of one or more extract content items. For instance, an extract lineage may include relationships amongst extract content items that stem from a common source content item. In at least one embodiment, an extract lineage can be represented by or included in a hierarchical extract structure. An extract lineage can map a path along edges from one node to another in an extract structure, where a first node in the mapping represents an example extract content item, a second node represents a source content item, and intervening nodes represent additional extract content items connected by edges between the first node and the second node.

Additionally, as used herein, the term "hierarchical extract structure" (or simply "extract structure") refers to a data structure that can store and/or define relationships amongst a source content item and one or more of its extract content items. In particular, a hierarchical extract structure can include (or include a link or identifier to) one or more content items (e.g., a source content item), one or more extract content items, and/or any corresponding extract metadata (e.g., lineage metadata). In some embodiments, a hierarchical extract structure can include layers of nodes that correspond to particular content items or extract content items, where a node in a first layer can correspond to a source content item and nodes in each subsequent layer can correspond to an extract content item derived recursively from a content item or extract content item of preceding layer. In some implementations, a hierarchical extract structure includes a subset of one or more extract content items and/or a link to their source content item. In at least one embodiment, a hierarchical extract structure can correspond to or include a content stack (or an extract stack) as described in U.S. patent application Ser. No. 18/344,041, titled GENERATING AND PROVIDING CONTENT STACKS UTILIZING MACHINE-LEARNING MODELS, filed Jun. 29, 2023, which is hereby incorporated herein by reference in its entirety.

Moreover, as used herein, the term "persistent storage location" refers to a non-volatile storage medium, repository, or logical storage environment configured to durably store digital data such that the data remains accessible after execution of a process or restart of a system. In particular, a persistent storage location can include physical or virtual storage resources that maintain content items, extract content items, or metadata (e.g., extract metadata) in a manner that preserves their availability and integrity across sessions, computing instances, and/or network operations. For example, a persistent storage location can include a local or network-accessible file system, a database, a cloud-based object store, or any directory, folder, or container within such storage resources configured to persistently store digital data.

As further used herein, the term "data governance rule" refers to a policy, parameter, or control condition that defines how data or digital content is managed, protected, or maintained within a computing environment. In particular, a data governance rule can specify operational requirements governing storage, access, retention, modification, and/or sharing of content items or extract content items to ensure consistent handling, traceability, and compliance with security or regulatory standards. For example, a data governance rule can include a permission rule (e.g., an access control list or ACL defining authorized operations), a retention rule (e.g., a duration or event-based condition for retaining or deleting data), a data classification policy, or other policy governing the lifecycle or accessibility of stored digital content.

As used herein, the term "extractor rule" refers to a condition, parameter, and/or logical directive that governs or influences the operation one or more extractor models in generating extract content items. In particular, an extractor rule can define criteria, thresholds, and/or configurations that control how, when, or to what extent a content item is processed to produce one or more extract content items.

As also used herein, the term "software connector" (or more simply "connector") refers to a computer code segment, application, or program that retrieves or extracts data and/or features that define information from user-account-facing applications, such as digital calendars, video call applications, email applications, text messaging applications, digital document applications, and other applications. In some cases, a connector is as described in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which are hereby incorporated herein by reference in their entireties. In one or more implementations, a connector is as described in U.S. patent application Ser. No. 18/776,830, titled DATA INGESTION UTILIZING A COORDINATOR AND CONNECTORS, filed Jul. 18, 2024, which is hereby incorporated herein by reference in its entirety. Further, in the same or other embodiments, a connector is as described in U.S. patent application Ser. No. 18/958,900, titled UPLOAD-DRIVEN AUTOMATIONS FOR CONTENT ITEMS, filed Nov. 25, 2024, which is hereby incorporated herein by reference in its entirety. Software connectors can use web hooks, long polling, another protocol to ingest content from, and provide instructions to, an external source into the environment of a content management system for interaction with content management system functions, including those of the unified search system.

Figure 2:
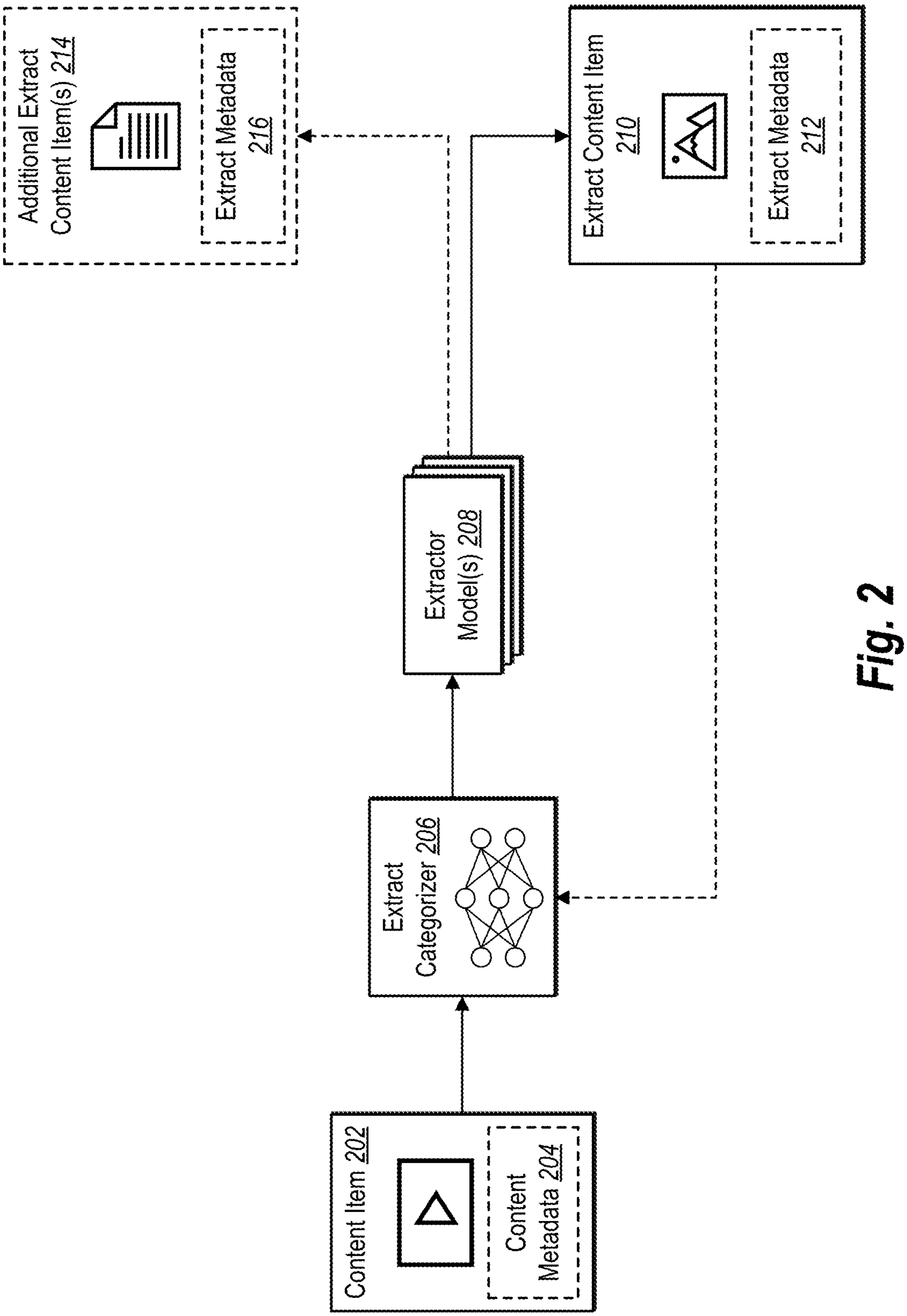
FIG. 2 illustrates an example diagram of utilizing one or more extractor models to recursively generate one or more extract content items in accordance with one or more embodiments.

Additional detail regarding the extract generation system 100 will again be provided with reference to the figures. For example, as mentioned above, the extract generation system 100 can determine an extractor model from a plurality of extractor models to generate an extract content item. In particular, the extract generation system 100 can utilize an extract categorizer to determine an extract model to generate an extract content item from another content item or extract content item. FIG. 2 illustrates an example diagram of utilizing one or more extractor models to recursively generate one or more extract content items in accordance with one or more embodiments.

As illustrated in FIG. 2, the extract generation system 100, the extract generation system 100 identifies a content item 202. In some embodiments, the content item 102 corresponds to or includes a multimedia content item (e.g., a file or some other complex filetype) that can include one or more primitive or simple content types included within it. As an example, the content item 202 may be a digital video content item. In one or more embodiments, the extract generation system 100 identifies the content item 102 from a storage database of a content management system.

Additionally or alternatively, the extract generation system 100 can identify the content item 202 based on connector data extracted from one or more software connectors associated with the content management system. In some instances, the one or more software connectors can be configured to interface with one or more data sources that are external to the content management system. As an example, the one or more software connectors can include an email connector configured to access messages or attachments from an external email service, a file-storage connector configured to retrieve files from an external cloud storage platform or service, an audio or video connector configured to import media from an external streaming or conferencing service, or other connectors that interface with external data providers (e.g., social media platforms) or application programming interfaces (APIs). In at least one embodiment, the extract generation system 100 extracts or ingests the connector data from the one or more software connectors and transforms the connector data into a data format compatible with storage or processing within the content management system. Accordingly, the extract generation system 100 may identify the content item 202 from the connector data that has been transformed and stored within the content management system.

As also illustrated in FIG. 2, the extract generation system 100 can determine content metadata 204 from the content item 202. For instance, the content metadata 204 can include, for example, governance metadata and/or action inheritance metadata. The governance metadata may include information of one or more data governance rules associated with the content item 202, such as one or more permission rules (e.g., ACLs) and/or one or more retention rules (e.g., a duration or event-based condition for retaining or deleting data). Further, the action inheritance metadata can include information of any actions or modifications made to the content item 202.

As additionally illustrated in FIG. 2, the extract generation system 100 begins a recursive process of generating extract content items from the content item 202. As part of this recursive process, the extract generation system 100 utilizes an extract categorizer 206 to determine or select an extractor model (e.g., a machine learning model) from a plurality of extractor models 208 to generate an extract content item 210. Specifically, the extract categorizer 206 can analyze the content item 202 and/or the content metadata 204 to categorize the content item 202 as a particular extract type or to determine that the content item 202 corresponds to a particular extract type (e.g., a video type). In at least one embodiment, the extract generation system 100 can also utilize the extract categorizer 206 (or another model, such as a detector model) to perform one or more additional checks, such as to make sure the content item 202 is not corrupted, that its format or extract type is in fact in the determined or labeled format or extract type, etc. Upon categorizing or determining the extract type, the extract generation system 100 can select an extractor model (or multiple extractor models) from the plurality of extractor models 208 that is configured to process content items of that particular extract type and to generate extract content items therefrom. For example, the extract generation system 100 may generate, from the content item 202, the extract content item 210 as a digital image or frame by utilizing a video frame or image extractor model.

Moreover, as illustrated in FIG. 2, the extract generation system 100 determines extract metadata 212 from the extract content item 210. To elaborate, the extract generation system 100 can determine the extract metadata 212 by passing down metadata from the content item 202 (e.g., the content metadata 204) to the extract content item 210 and/or by determining new metadata that was applied to the extract content item 210 (e.g., rather than to the content item 202). For example, the extract metadata 212 can include lineage metadata, governance metadata, and/or action inheritance metadata. The lineage metadata of the extract metadata 212 can include, for example, identifiers or references linking the extract content item 210 to the content item 202.

In one or more embodiments, the governance metadata of the extract metadata 212 includes the data governance rules (e.g., set by an administrator, an application, or at the system level) that are associated with the content item 202. The extract generation system 100 can apply those data governance rules to the extract content item 210 according to the governance metadata. Thus, the extract generation system 100 can ensure that the data governance rules remain consistently enforceable across related extract content items and their corresponding source content item. In at least one embodiment, the extract generation system 100 can provide, for display in a client device, one or more elements that are selectable to modify the data governance rules and how they apply between content items and/or extract content items.

In at least one embodiment, the action inheritance metadata includes the information of any actions or modifications made to the content item 202 and/or to the extract content item 210. In some instances, the extract generation system 100 can identify one or more actions or modifications made to the content item 202 from the action inheritance metadata and propagate those actions or modifications to the extract content item 210. In at least one embodiment, the extract generation system 100 can provide, for display in a client device, one or more elements that are selectable to modify the how actions and/or modifications are applied between content items and/or extract content items.

In at least one embodiment, and as illustrated in FIG. 2, the extract generation system 100 generates one or more additional extract content items based on determining that additional extraction from the extract content item 210 is possible. Upon so determining, the extract generation system 100 can utilize the extract categorizer 206 to determine or select an extractor model from a plurality of extractor models 208 to generate an additional extract content item 214. In at least one embodiment, the extract generation system 100 can also utilize the extract categorizer 206 (or another model, such as the detector model) to perform one or more additional checks, such as to make sure the extract content item 210 is not corrupted, that its format or extract type is in fact in the determined or labeled format or extract type, etc.

In some instances, the extract generation system 100 determines or selects the extractor model for generating the additional extract content item 214 as described above in relation to selecting the extractor model for generating the extract content item 210. For example, the extract generation system 100 can determine an extract type of the extract content item 210 and select an extractor model that is configured to process content items of that particular type and to generate extract content items therefrom. To illustrate, the extract generation system 100 may generate, from the extract content item 210, the additional extract content item 214 as a digital document or text by utilizing an OCR-based extractor model.

As shown in FIG. 2, the extract generation system 100 determines extract metadata 216 from the additional extract content item 214. To elaborate, the extract generation system 100 can determine the extract metadata 216 by passing down metadata from the content item 202 (e.g., the content metadata 204) to the extract content item 210 (and/or directly from the extract content item 210). Additionally or alternatively, the extract generation system 100 can determine new metadata that was applied to the additional extract content item 214 (e.g., rather than to the content item 202 or the extract content item 210). For example, similar to the extract metadata 212, the extract metadata 212 can include lineage metadata, governance metadata, and/or action inheritance metadata. In some embodiments, the lineage metadata of the extract metadata 216 includes identifiers or references linking the additional extract content item 214 to the extract content item 210 and, ultimately, to the content item 202.

Additionally or alternatively, the governance metadata of the extract metadata 216 can include the data governance rules that are associated with the content item 202 and/or the extract content item 210. The extract generation system 100 can apply the data governance rules to the additional extract content item 214 according to the governance metadata, as described above. In the same or other embodiments, the action inheritance metadata includes the information of any actions or modifications made to the content item 202, the extract content item 210, and/or to the additional extract content item 214. The extract generation system 100 can identify any actions or modifications made to the content item 202 and/or to the extract content item 210 from the inheritance metadata and propagate those actions or modifications to the additional extract content item 214 as described above.

In at least one embodiment, the extract generation system 100 recursively generates still other extract content items. Specifically, the extract generation system 100 can determine that additional extraction from the additional extract content item 214 and/or from each successive additional extract content item is possible (e.g., by determining that more primitive data is extractable from one or more extract content items). Upon making this determination, the extract generation system 100 can continue to generate extract content items from a preceding extract content item (e.g., the additional extract content item 214) until reaching a threshold primitive level of extracted content. Thus, the extract generation system 100 can recursively expand an extract lineage to include one or more additional extract content items at respective generations with extract types that are increasingly primitive or simple until reaching the threshold primitive level.

Further, the extract generation system 100 can generate a plurality of content items at a particular layer or extract generation. For instance, the content item 202 may represent a first generation. At the second generation, the extract generation system 100 can generate the extract content item 210 and, in some cases, one or more additional content items from the same content item, that is, from the content item 202. As an example, the extract content item 210 may correspond to a digital image extracted from the content item 202 and an extract content item from one or more additional content items at the second generation may correspond to an audio file or extracted from the content item 202. At the third generation, the extract generation system 100 can include a plurality of extract content items from the one or more additional extract content items 214, and so on until the threshold primitive level is reached.

In at least one embodiment, the threshold primitive level can correspond to a level of content-type extraction at which no further or alternative type of content-type extraction can practically or plausibly be performed. Additionally or alternatively, the threshold primitive level (or a threshold number of layers or generations) can represent a level of content-type extraction beyond which the extract generation system 100 determines (e.g., automatically or in response to a user interaction) that no additional extractions should otherwise be performed. As an example, the extract generation system 100 provides, for display in a client device, one or more elements that are selectable to define an extractor rule that determines the threshold primitive level, as described in greater detail below (e.g., in relation to FIG. 7).

Figure 3:
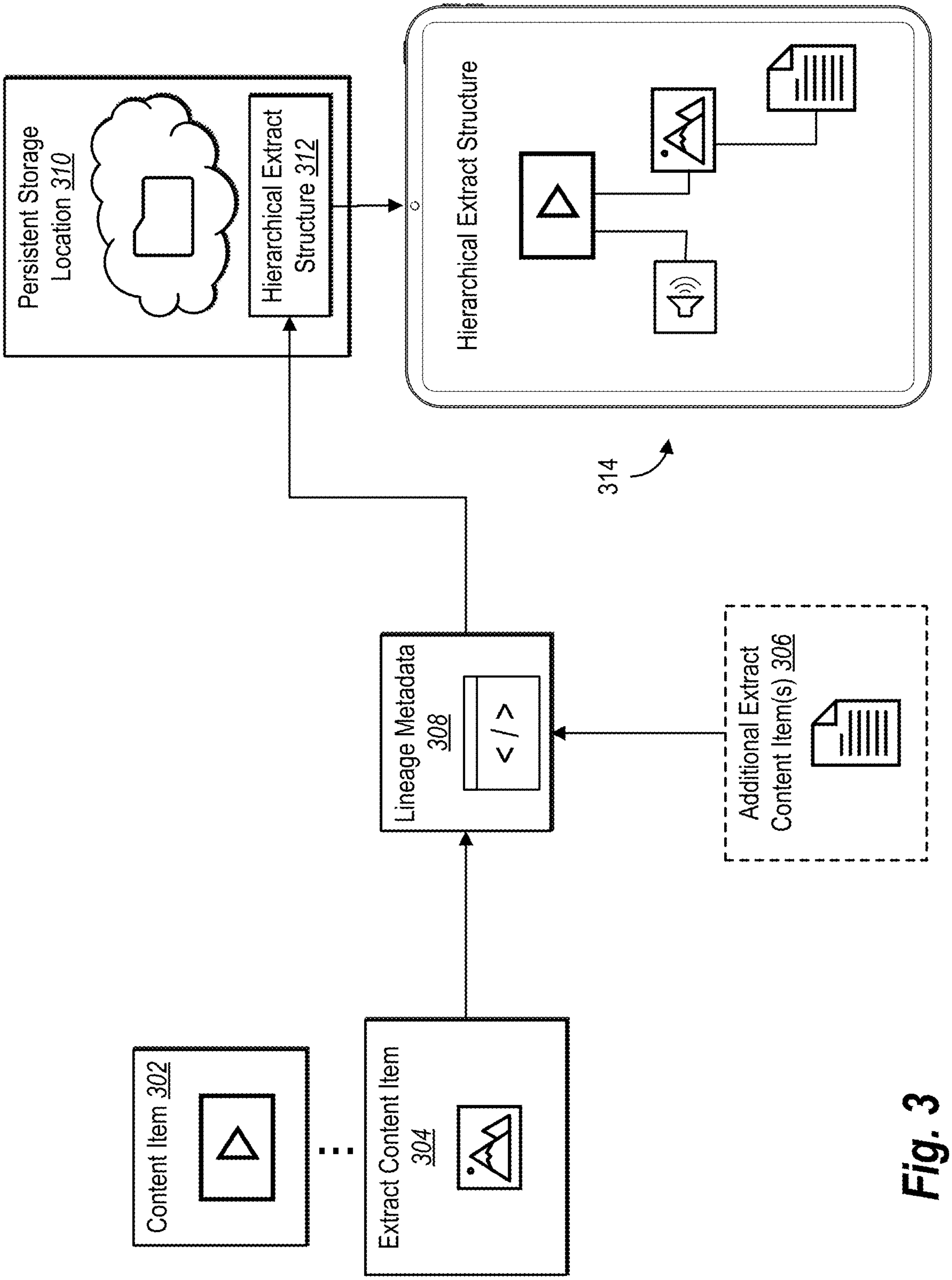
FIG. 3 illustrates an example diagram of generating and providing a hierarchical extract structure for display on a client device in accordance with one or more embodiments.

As expressed above, the extract generation system 100 can generate a hierarchical extract structure. In particular, the extract generation system 100 can generate a hierarchical extract structure that includes a content item, one or more extract content items, and/or extract metadata (e.g., lineage metadata). FIG. 3 illustrates an example diagram of generating a hierarchical extract structure and providing it for display in a client device in accordance with one or more embodiments.

As illustrated in FIG. 3, the extract generation system 100 identifies a content item 302 and generates an extract content item 304 and, in some instances, one or more additional extract content items 306. In at least one embodiment, the extract generation system 100 identifies the content item 302 and generates the extract content item 304 and/or the one or more additional extract content items 306 as described above (e.g., in relation to FIG. 2).

As also illustrated in FIG. 3, the extract generation system 100 determines extract metadata, which includes lineage metadata 308. In particular, the extract generation system 100 can determine the lineage metadata 308, that maps back to the content item 302, from the extract content item 304 and/or the one or more additional extract content items 306. For instance, the extract generation system 100 can determine the lineage metadata 308 based on the extract content item 304 and subsequently expand the lineage metadata 308 (e.g., to generate an expanded extract lineage) to include metadata associated with each additional extract content item of the one or more additional extract content items 306. In at least one embodiment, the extract generation system 100 determines extract metadata and the lineage metadata 308 as described above (e.g., in relation to FIG. 2).

In one or more embodiments, the extract generation system 100 generates a lineage data representation based on the lineage metadata 308. For example, the extract generation system 100 can generate a lineage data representation that organizes, visualizes, or otherwise encodes the lineage metadata 308 to depict relationships among the content item 302, the extract content item 304, and any additional extract content items. With the lineage data representation, the extract generation system 100 can quickly, efficiently, and accurately determine (or enable a user of a user account to determine) the extract lineage extending from the source content item (the content item 302) to a primitive or simple extract content item. In some implementations, the lineage data representation can include a metadata table, metadata graph, metadata index, or other structured data representation of the lineage metadata 308.

As additionally illustrated in FIG. 3, the extract generation system 100 generates a hierarchical extract structure 312. In particular, the extract generation system 100 can generate the hierarchical extract structure 312 that can include one or more components, such as the content item 302, the extract content item 304, any additional extract content items, and/or the extract metadata (e.g., the lineage metadata 308 and/or the lineage data representation). In at least one embodiment, the extract generation system 100 generates the hierarchical extract structure by generating nodes, edges that connect the nodes, and/or layers for each respective generation of content items or extract content items.

To illustrate, the extract generation system 100 can generate nodes representing respective content items and/or extract content items and edges representing extraction relationships between the nodes (e.g., the content item from which an extract content item is extracted). As an example, the extract generation system 100 can generate a root node representing the content item 302, a second node representing the extract content item 304, a third node for a second extract content item generated at the same extract generation as the extract content item 304, and a fourth node for a third extract content item generated at a subsequent extract generation. The extract generation system 100 can connect, with edges, the root node to the second node and the third node, and the second node to the fourth node.

Additionally, the extract generation system 100 can generate layers for one or more extract content items and/or their respective nodes based on their extract generation. For instance, each layer can represent an extract generation that can have multiple nodes (except for, in some cases, the first layer), until reaching a bottom layer where no more extraction is possible (or a threshold number of layers is reached). Continuing the example started above, the extract generation system 100 can generate a first layer of the hierarchical extract structure 312 that can include the root node and a second layer of the hierarchical extract structure 312 that can include the second node and the third node. Additionally, the extract generation system 100 can generate a third layer of the hierarchical extract structure 312 that can include the fourth node.

Upon generating each layer of the hierarchical extract structure 312, the extract generation system 100 can associate each layer together. For instance, the extract generation system 100 can utilize the lineage metadata 308 and/or the lineage data representation to link each layer of the hierarchical extract structure 312 together from the first layer to the last layer. For example, the extract generation system 100 can associate each layer by linking identifiers or references within the lineage metadata 308 (or as indicated in the lineage data representation) that indicate parent-child relationships between content items and/or extract content items, thereby establishing ordered connections among successive layers of the hierarchical extract structure. In at least one embodiment, the extract generation system 100 includes extract metadata at each layer of the hierarchical extract structure, where the extract metadata at each layer corresponds to the content item 302 or to an extract content item represented at that layer. Additionally or alternatively, the extract generation system 100 can maintain the extract metadata (e.g., the lineage metadata 308 and/or the lineage data representation) as a distinct structure within the hierarchical extract structure, such as in a separate metadata layer or associated metadata repository.

Moreover, as illustrated in FIG. 3, the extract generation system 100 stores the content item 302, the extract content item 304, any additional extract content items, and/or the extract metadata (e.g., the lineage metadata 308 and/or the lineage data representation) in a persistent storage location 310 within the content management system. As an example, the extract generation system 100 can store the hierarchical extract structure 312 in the persistent storage location 310. In particular, the extract generation system 100 can store the hierarchical extract structure 312 (or any individual component or subset of components thereof) in a shared extract lineage folder (or a sibling folder) within the persistent storage location 310.

Further, the extract generation system 100 can utilize the persistent storage location 310 to synchronize the content item 302, the extract content item 304, the one or more additional extract content items 306, and/or the extract metadata between client devices associated with one or more user accounts of the content management system. As an example, the extract generation system 100 can utilize a detector model to detect a modification to the extract content item made in response to a user interaction with a client device. The extract generation system 100 can then automatically synchronize the extract content item 304 amongst any additional or alternative user accounts and/or client devices so that each user account and/or client device reflects or includes the modification. In at least one embodiment, the extract generation system 100 provides, for display in a client device, one or more elements selectable to enable or disable synchronization to and/or from at least one client device or user account.

Further, as illustrated in FIG. 3, the extract generation system 100 provides the content item 302, the extract content item 304, any additional extract content items, and/or the extract metadata (e.g., the lineage metadata 308 and/or the lineage data representation) for display on a client device 314 that is associated with the content management system. For instance, the extract generation system 100 can provide the hierarchical extract structure 312 for display in a user interface of the client device 314. In at least one embodiment, the extract generation system 100 can provide one or more elements that are selectable to view, edit, hide, share, or otherwise manage the hierarchical extract structure 312 (or any individual component or subset of components thereof), as described below in greater detail (e.g., in relation to FIG. 6).

Figure 4:
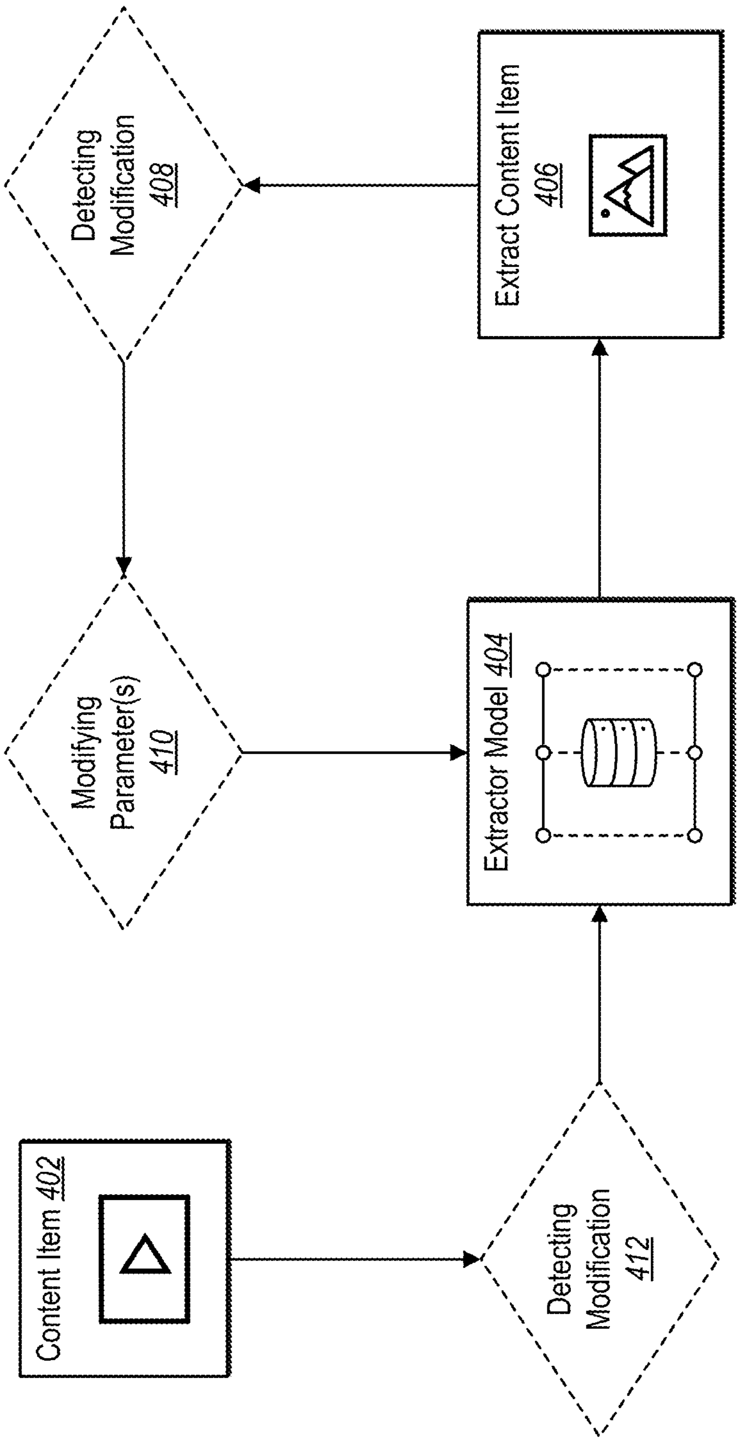
FIG. 4 illustrates an example diagram of modifying one or more parameters of an extractor model in response to detecting a modification to an extract content item in accordance with one or more embodiments.

As expressed above, the extract generation system 100 can detect a modification to a content item and/or an extract content item and propagate the modification accordingly. In some instances, the extract generation system 100 utilizes a detector model to detect a modification to an extract content item, and in response, the extract generation system 100 can modify one or more parameters an extractor model to reflect the modifications made to the extract content item. FIG. 4 illustrates an example diagram of modifying one or more parameters of an extractor model in response to detecting a modification to an extract content item in accordance with one or more embodiments.

As illustrated in FIG. 4, the extract generation system 100 can generate an extract content item 406 from a content item 402. In particular, the extract generation system 100 can utilize an extractor model 404 (or a plurality of extractor models) to generate or extract the extract content item 406 from the content item 402. In at least one embodiment, the extract generation system 100 generates the extract content item 406 as described above in greater detail (e.g., in relation to FIG. 2).

As also illustrated in FIG. 4, the extract generation system 100 can implement a feedback loop which includes an act 408 of detecting one or more modifications to the extract content item 406. For example, the extract generation system 100 can utilize a detector model (or watcher model) to monitor a content management system (e.g., directories of the content management system) and/or associated metadata to detect that the extract content item 406 has been edited, deleted, or restored. Additionally or alternatively, the extract generation system 100 can utilize the detector model to monitor the content management system and/or associated metadata to detect that one or more settings, parameters, and/or data governance rules associated with the extract content item 406 have been modified.

Additionally, as illustrated in FIG. 4, the extract generation system 100 performs the act 410 of modifying one or more parameters of the extractor model 404 (or of a plurality of extractor models). Specifically, upon detecting the one or more modifications to the extract content item 406 (or one or more additional or alternative extract content items), the extract generation system 100 can modify one or more parameters of the extractor model 404 (e.g., by fine-tuning or retraining the extractor model 404) to reflect the one or more modifications made to the extract content item 406. For example, in response to detecting a modification to the extract content item 406, the extract generation system 100 can perform the act 410 such that, when the extractor model 404 subsequently generates an additional or alternative extract content item of the same or similar extract type, the extractor model 404 can generate the additional or alternative extract content item to include a similar modification (e.g., within a threshold level of similarity).

In the same or other embodiments, in response to detecting a deletion of an extract content item, the extract generation system 100 can perform the act 410 to update the extractor model 404 so that it does not generate a subsequent extract content item having a threshold level of similarity to the deleted extract content item. Additionally or alternatively, in response to detecting restoration of an extract content item (e.g., following a deletion), the extract generation system 100 can perform the act 410 to enable the extractor model 404 to continue generating one or more additional extract content items having a threshold level of similarity to the restored extract content item. In at least one embodiment, in response to detecting a deletion or restoration of an extract content item, the extract generation system 100 generates and provides, for display on a client device, a digital notification suggesting that subsequent extract content items having a threshold level of similarity not be generated or continue to be generated, respectively. Upon detecting a user interaction with a selectable element of the digital notification, the extract generation system 100 can withhold or continue generating such extract content items. In the same or other embodiments, the extract generation system 100 automatically (e.g., without user interaction) withholds or continues generating such extract content items.

Moreover, as illustrated in FIG. 4, the extract generation system 100 can perform an act 412 of detecting one or more modifications to the content item 402 (or to an extract content item). Specifically, much like the act 408, the extract generation system 100 can utilize the detector model to monitor the content management system and/or associated metadata to detect that the content item 402 (or an extract content item) has been edited, deleted, or restored. Additionally or alternatively, the extract generation system 100 can utilize the detector model to monitor the content management system and/or associated metadata to detect that one or more settings, parameters, and/or data governance rules associated with the content item 402 (or of an extract content item) have been modified.

In one or more embodiments, in response to performing the act 412, the extract generation system 100 can propagate the one or more modifications to one or more subsequent extract content items. For instance, in response to performing the act 412, the extract generation system 100 can generate the extract content item 406 (e.g., utilizing the extractor model 404) to include the one or more modifications in the extract content item 406. Additionally or alternatively, in response to performing the act 412, the extract generation system 100 can generate one or more modified extract content items by modifying the extract content item (and/or one or more subsequent extract content items located at layers in a hierarchical extract structure beneath the extract content item 406) to include the one or more modifications. Additionally or alternatively, the extract generation system 100 can utilize a persistent storage location to synchronize one or more modification to the content item 402 and/or an extract content item between client devices associated with one or more user accounts of the content management system, as described in greater detail above (e.g., in relation to FIG. 3).

In at least one embodiment, the extract generation system 100 deletes (or hides) one or more extract content items located at layers in a hierarchical extract structure beneath a deleted content item or a deleted extract content item. In some embodiments, the extract generation system 100 automatically (e.g., without a user interaction) deletes (or hides) the one or more extract content items located at lower layers in a hierarchical extract structure in response to detecting that the content item 402 or an extract content item was deleted. In the same or other embodiments, the extract generation system 100 generates and provides, for display on a client device, a digital notification suggesting that the one or more extract content items located at lower layers in a hierarchical extract structure be deleted (or hid from view). Upon detecting a user interaction with a selectable element of the digital notification, the extract generation system 100 can delete or hide the one or more extract content items.

Similarly, the extract generation system 100 can restore one or more extract content items upon detecting that the content item 402 or an extract content item has been restored (e.g., from a deletion or hiding). In some embodiments, the extract generation system 100 automatically (e.g., without a user interaction) restores one or more extract content items located at lower layers in a hierarchical extract structure in response to detecting that the content item 402 or an extract content item was restored. In the same or other embodiments, the extract generation system 100 generates and provides, for display on a client device, a digital notification suggesting that the one or more extract content items located at lower layers in a hierarchical extract structure be restored. Upon detecting a user interaction with a selectable element of the digital notification, the extract generation system 100 can restore the one or more extract content items.

In one or more embodiments, the extract generation system 100 generates and provides a user interface, for display in a client device, for managing modifications. For instance, the extract generation system 100 can generate and provide one or more elements in the user interface that are selectable to define how a modification to a content item or an extract content item can impact one or more extractor models or extract content items.

Figure 5:
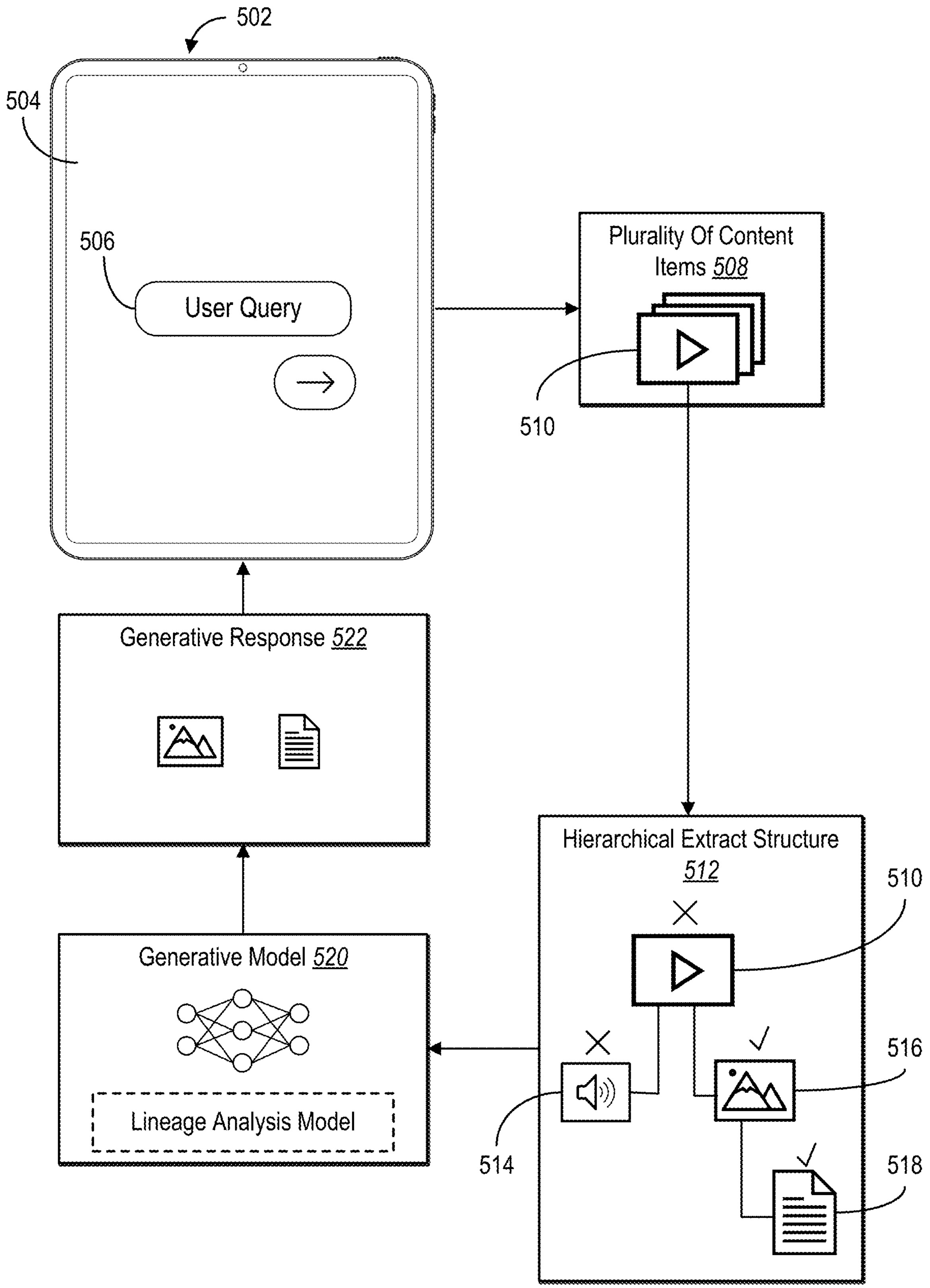
FIG. 5 illustrates an example diagram of utilizing a generative model to generate a generative response to a user query based on a hierarchical extract structure in accordance with one or more embodiments.

As expressed above, the extract generation system 100 can generate a generative response to a user query. In particular, the extract generation system 100 can, in response to receiving a user query, utilize a hierarchical extract structure and a generative model to generate a generative response to the user query. FIG. 5 illustrates an example diagram of utilizing a generative model to generate a generative response to a user query based on a hierarchical extract structure in accordance with one or more embodiments.

As illustrated in FIG. 5, the extract generation system 100 provides a user interface 504 for display in a client device 502. In response to an interaction with the user interface 504, the extract generation system 100 can receive a user query 506. In at least one embodiment, the user query 506 may include a question and/or a directive, statement, prompt, or other command.

As also illustrated in FIG. 5, the extract generation system 100 determines (e.g., utilizing a machine learning model, such as a generative model 520) a content item 510 from a plurality of content items 508 that is relevant to the user query 506. In particular, the extract generation system 100 can generate a relevancy score for each content item in the plurality of content items 508 by comparing the user query 506 to each content item. For example, the extract generation system 100 can generate each relevancy score by comparing one or more features, terms, and/or attributes of the user query 506 to corresponding features, terms, and/or attributes of each content item. In some instances, the extract generation system 100 selects the content item 510 based on determining that the content item 510 satisfies a relevance threshold to the user query 506, such as if the content item 510 has a relevancy score that satisfies the relevance threshold.

As additionally illustrated in FIG. 5, the extract generation system 100 generates or identifies a hierarchical extract structure 512 for the content item 510. In particular, the extract generation system 100 can generate or identify the hierarchical extract structure 512 that includes one or more components, such as the content item 510, one or more extract content items, and/or extract metadata (e.g., a lineage data representation). For instance, the extract generation system 100 can generate the hierarchical extract structure 512, or identify the hierarchical extract structure 512 that was previously generated, as described in greater detail above (e.g., in relation to FIG. 3).

Moreover, as illustrated in FIG. 5, the extract generation system 100 identifies one or more components of the hierarchical extract structure to utilize in generating a generative response 522 to the user query 506. Specifically, upon determining that the content item 510 is relevant to the user query 506, the extract generation system 100 can determine (e.g., utilizing a machine learning model, such as the generative model 520) that at least one component of the hierarchical extract structure 512 satisfies a relevance threshold to the user query 506. For instance, the extract generation system 100 can analyze the content item 510, any extract content items, and/or the extract metadata to identify or determine at least one component that satisfies an additional relevance threshold to the user query 506.

As an example, the extract generation system 100 can generate a relevancy score for each component of the hierarchical extract structure 512 by comparing the user query 506 to each component. For example, the extract generation system 100 can generate each relevancy score by comparing one or more features, terms, and/or attributes of the user query 506 to corresponding features, terms, and/or attributes of each component of the hierarchical extract structure 512. In some instances, the extract generation system 100 selects one or more components based on determining that they satisfy the additional relevance threshold to the user query 506 (e.g., by determining that they have a relevancy score that satisfies the additional relevance threshold).

As further illustrated in FIG. 5, the extract generation system 100 utilizes the generative model 520 to generate the generative response 522 to the user query 506. In some instances, the generative model 520 can correspond to or include a machine learning model (e.g., a generative machine learning model), such as a neural network or LLM. In at least one embodiment, the generative model 520 can correspond to, include, or utilize a lineage analysis model (e.g., a lineage analysis machine learning model). In such instances, the extract generation system 100 can provide the hierarchical extract structure 512 to the lineage analysis model for analysis. Upon utilizing the lineage analysis model to analyze the hierarchical extract structure 512, the extract generation system 100 can utilize the lineage analysis model to identify and select the one or more components of the hierarchical extract structure 512 to utilize in generating the generative response 522. Additionally or alternatively, the extract generation system 100 can identify and select the one or more extract content items of the hierarchical extract structure 512 to utilize in generating the generative response 522 (e.g., with or without the generative model 520), and can subsequently provide the extract content items to the generative model 520 to utilize in generating the generative response 522.

In at least one embodiment, the extract generation system 100 identifies and selects at least one extract content item to utilize in generating the generative response 522 instead of (e.g., not including) the content item 510. To elaborate, in some cases, content items from the plurality of content items 508 can include complex multimedia files, which can consume excessive amounts of time and resources to process and utilize. Accordingly, by utilizing one or more extract content items rather than the complex multimedia files associated with some content items, the extract generation system 100 can improve efficiency by enabling processing of lower-level and less complex components that can be processed in less time and a decreased consumption of computing resources.

Indeed, because these lower-level components can include smaller and more simple files, using the lower-level components can use up fewer tokens of a context window of a generative model (e.g., of the generative model 520). As a result, the extract generation system 100 can facilitate using smaller and faster generative models (e.g., LLMs) for applications that previously required larger, slower, and more expensive models. Moreover, by selecting one or more extract content items that satisfy the additional relevance threshold, the extract generation system 100 can ensure that additional processing and generation of the generative response 522 only need focus on select extract content items having higher relevance, rather than the content item 510 as a whole.

As shown in FIG. 5, the extract generation system 100 can intelligently determine and select relevant extract content items from the hierarchical extract structure 512. For example, as shown, the extract generation system 100 may determine that an extract content item 516 and an extract content item 518 satisfy the additional relevance threshold and select them for utilization in generating the generative response 522. Additionally or alternatively, the extract generation system 100 may determine that content item 510 and/or an extract content item 514 fail to satisfy the additional relevance threshold and determine not to select these for utilization in generating the generative response 522.

As also shown in FIG. 5, the extract generation system 100 can generate the generative response 522 utilizing the selected components (e.g., one or more extract content items) of the hierarchical extract structure 512. As an example, the extract generation system 100 can utilize the extract content item 516 (e.g., a digital image) and the extract content item 518 (e.g., a digital document) to generate the generative response 522. In some instances, the extract generation system 100 utilizes the generative model 520 (e.g., the lineage analysis model) to analyze the user query 506 and generate a response to it that includes information from one or more of the selected components (e.g., the extract content items 516, 518), or that includes one or more of the selected components themselves.

In one or more embodiments, the extract generation system 100 utilizes the generative model 520 (and/or the lineage analysis model) that is trained on hierarchical extract structure data. In some instances, the generative model 520 (and/or the lineage analysis model) can be fine-tuned or retrained utilizing a loss function. For example, the extract generation system 100 can select one or more components of a hierarchical extract structure and utilize the one or more selected components to generate a generative response. The extract generation system 100 can then compare the generative response to ground truth data, determine a measure of loss utilizing the loss function based on the comparison, and modify one or more parameters of the generative model 520 (and/or the lineage analysis model) based on the measure of loss.

Figure 6:
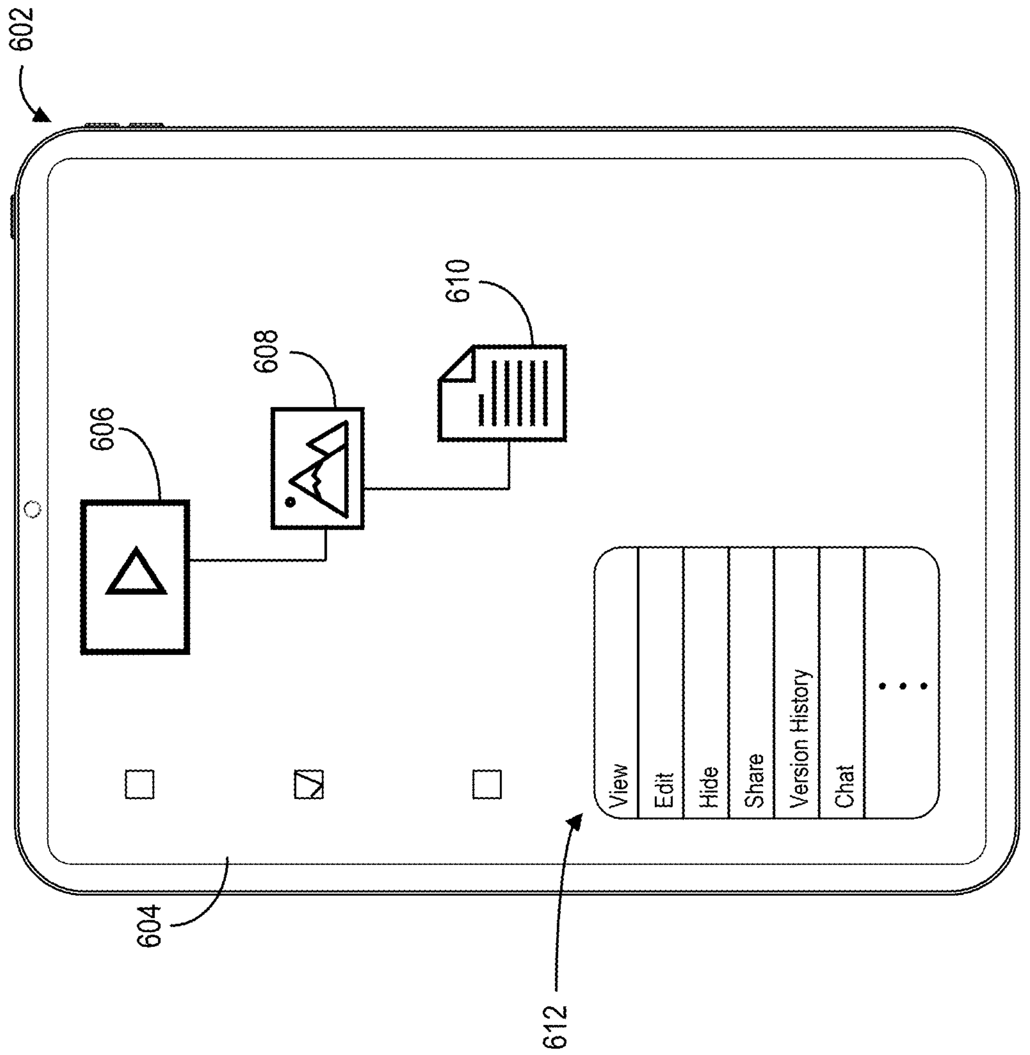
FIG. 6 illustrates an example user interface for managing a content item and/or one or more extract content items included in a hierarchical extract structure in accordance with one or more embodiments.

As expressed above, the extract generation system 100 can provide one or more elements in a user interface on a client device that are selectable to manage one or more components of a hierarchical extract structure. In particular, the extract generation system 100 can generate and provide the one or more elements to manage a content item, one or more extract content items, and/or extract metadata. FIG. 6 illustrates an example user interface for managing a content item and/or one or more extract content items included in a hierarchical extract structure in accordance with one or more embodiments.

As illustrated in FIG. 6, the extract generation system 100 generates and provides, for display in a client device 602 associated with a content management system, a user interface 604 to manage one or more components of at least one hierarchical extract structure. To illustrate, the extract generation system 100 can provide a hierarchical extract structure for display in the user interface 604. The hierarchical extract structure may include one or more components, such as a content item 606 (e.g., a source content item), an extract content item 608, an additional extract content item 610, and/or extract metadata (e.g., a lineage data representation).

As also illustrated in FIG. 6, the extract generation system 100 can provide one or more elements for selecting one or more components of the hierarchical data structure. In at least one embodiment, in response to a user interaction with the user interface 604, the extract generation system 100 can select one or more components for management. For instance, as shown, the extract generation system 100 selects the extract content item 608 (e.g., indicated by the check-marked element) for management.

Additionally, as illustrated in FIG. 6, the extract generation system 100 generates and/or provides a management window 612 for managing the one or more selected components. In at least one embodiment, the management window 612 includes one or more elements that are selectable to, for example, view, edit or modify, hide from view, share, access or view a version history, or initiate (or continue) a chat associated with the one or more selected components. Additionally or alternatively, management window 612 may include one or more additional or alternative elements for still further management of the one or more selected components, such as one or more elements for deleting or restoring one or more selected components and/or for defining one or more extractor rules (e.g., as described in greater detail below in relation to FIG. 7).

In one or more embodiments, in response to an interaction with a "view" element of the management window 612, the extract generation system 100 provides the one or more selected components for display in the user interface 604. Additionally or alternatively, in response to an interaction with a "hide" element of the management window 612, the extract generation system 100 can hide visualization of the one or more selected components so that they cannot be viewed or displayed in the user interface 604. Thus, for example, the extract generation system 100 can display the extract content item 608 and/or hide the extract content item 608 from display in the user interface 604.

Moreover, in response to an interaction with an "edit" element, the extract generation system 100 can provide one or more editing tools or features for display in the user interface 604 to edit or modify the one or more selected components. For example, the extract generation system 100 can provide editing tools or features (e.g., digital image editing tools or features) for editing or modifying the extract content item 608. In response to detecting a modification to one or more components of the hierarchical extract structure, the extract generation system 100 can propagate the modification to one or more extract content items, modify one or more parameters of an extractor model, and/or synchronize the component across client devices associated with the content management system, as described above in greater detail (e.g., in relation to FIGS. 3-4).

Further, in response to an interaction with a "share" element of the management window 612, the extract generation system 100 can provide share the one or more selected components with one or more additional or alternative client devices and/or user accounts. In some cases, the one or more client devices and/or user accounts may be associated with the content management system or with one or more systems located at servers external to the content management system. The extract generation system 100 can thus share an entire hierarchical extract structure and/or individual components or a subset of components thereof. In some embodiments, the extract generation system 100 shares one or more data objects of the hierarchical extract structure or of the one or more selected components thereof. In the same or other embodiments, the extract generation system 100 can share a link or identifier associated with the hierarchical extract structure (e.g., within a content stack or extract stack) or the one or more selected components that, when accessed or selected, directs a user account or client device to the corresponding data objects, thereby providing for sharing digital content with improved speed and efficiency.

In one or more embodiments, in response to an interaction with a "version history" element of the management window 612, the extract generation system 100 generates and/or provides a historical data representation or historical list that includes a history of the one or more selected components. For instance, the historical data representation or historical list can include a detailed history of edits or modifications, deletions, restorations, shares, and/or other interactions or management acts associated with the one or more selected components. Thus, the extract generation system 100 can enable auditing of hierarchical extract structures, thereby helping to improve accuracy and security.

Further, in the same or other embodiments, in response to an interaction with a "chat" element of the management window 612, the extract generation system 100 generates and/or provides a chat interface for communicating with one or more management agents about the one or more selected components. For example, each management agent may include an agentic system (e.g., an artificial intelligence or AI system)—such as a machine learning model, neural network, or LLM-configured to receive and respond to user queries about particular content items or extract content items. In some embodiments, the extract generation system 100 utilizes a plurality of management agents that can each be trained on data associated with particular content item or extract content item extract types, thereby enabling specialized analysis and generative responses based on the type of content under consideration. As an example, the extract generation system 100 can receive a user query (e.g., a question and/or a directive, statement, prompt, or other command) about the one or more selected components; analyze one or more features, terms, and/or attributes of the user query; determine one or more management agents to respond to the user query based on the analysis; and utilize the one or more management agents to respond to the user query.

In one or more embodiments, the extract generation system 100 can also provide a search feature and/or one or more search filters for display in the client device 602. For instance, the extract generation system 100 can provide a general search, from which the extract generation system 100 can determine and/or provide a hierarchical extract structure in response to one or more search parameters. Additionally or alternatively, the extract generation system 100 can provide an advanced search, from which the extract generation system 100 can provide one or more particular components from a hierarchical extract structure.

Figure 7:
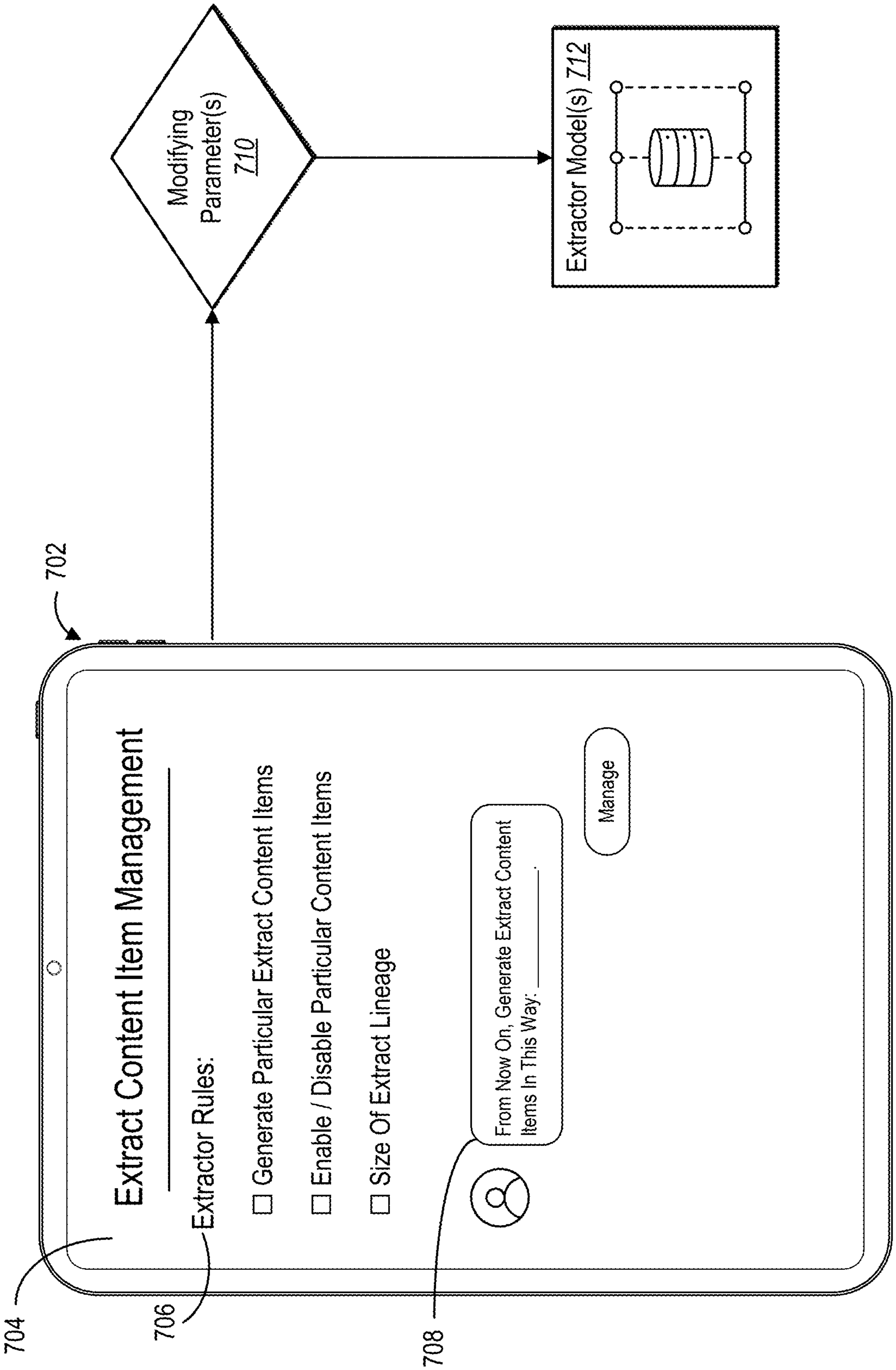
FIG. 7 illustrates an example user interface for defining one or more extractor rules and an example diagram of modifying one or more parameters of an extractor model based on the one or more extractor rules in accordance with one or more embodiments.

As expressed above, the extract generation system 100 can enable defining one or more extractor rules for managing the generation of extract content items. In particular, the extract generation system 100 can generate and/or provide, for display on a client device, one or more elements selectable to define the one or more extractor rules. FIG. 7 illustrates an example user interface for defining one or more extractor rules and an example diagram of modifying one or more parameters of an extractor model based on the one or more extractor rules in accordance with one or more embodiments.

As illustrated in FIG. 7, the extract generation system 100 generates and/or provides, for display in a client device 702, a user interface 704 for managing generating extract content items from other content items. In particular, the extract generation system 100 can provide, in the user interface 704, one or more elements that are selectable to define one or more extractor rules 706 that can be used to manage generation of extract content items. In some instances, the one or more extractor rules 706 can include extract content item generation parameters and/or directives that can be modified to manage generating extract content items. In at least one embodiment, the one or more extractor rules 706 may be system defined and/or user defined (e.g., in response to a user input). Although FIG. 7 only shows several extractor rules, the extract generation system 100 may define one or more additional or alternative extractor rules than those shown.

As also illustrated in FIG. 7, the one or more extractor rules 706 include a customizer extractor rule for generating particular extract content items. In particular, the extract generation system 100 can utilize the customizer extractor rule to generate additional or alternative extract content items and/or determine how and when extract content items should be generated. For instance, in response to a user interaction with the customizer extractor rule, the extract generation system 100 can generate additional or alternative extract content items not previously or currently being generated, thereby enabling a user account to create its own extract content items or workflows. As an example, the extract generation system 100 can utilize the customizer extractor rule to generate a custom workflow not previously anticipated by the extract generation system 100. To illustrate, the customizer extractor rule can be defined to enable the extract generation system 100 to, upon detecting a content item or extract content item that includes particular features, generate one or more particular extract content items from the detected content item.

As additionally illustrated in FIG. 7, the one or more extractor rules 706 include an extract type extractor rule for enabling and/or disabling particular content items. In particular, the extract generation system 100 can utilize the extract type extractor rule to determine which particular extract content items the extract generation system 100 can generate. To elaborate, in response to a user interaction with the extract type extractor rule, the extract generation system 100 can determine which types (e.g., extract types) of extract content items that the extract generation system 100 will or will not generate. For instance, the extract generation system 100 can define the extract type extractor rule to only allow the extract generation system 100 to generate extract content items corresponding to audio recordings, digital images, or digital documents.

Moreover, using the extract type extractor rule, the extract generation system 100 can determine which types (e.g., extract types) the extract generation system 100 can generate from other types (e.g., extract types) of content items. For example, the extract generation system 100 can define the extract type extractor rule to only allow the extract generation system 100 to generate digital documents from digital video content items. Additionally or alternatively, using the extract type extractor rule, the extract generation system 100 can determine which particular content items (e.g. source content items) the extract generation system 100 can generate extract content items from (e.g., only from digital video content items).

Moreover, as illustrated in FIG. 7, the one or more extractor rules 706 include an extract size extractor rule for defining a size of an extract lineage. Specifically, the extract generation system 100 can utilize the extract size extractor rule to determine how many extract content items to generate in an extract lineage and/or in a hierarchical extract structure. Additionally or alternatively, the extract generation system 100 can utilize the extract size extractor rule to determine a lineage data size (e.g., in megabytes or gigabytes) representing the cumulative data size of extract content items that can be included in an extract lineage and/or in a hierarchical extract structure. Accordingly, by applying the extract size extractor rule, the extract generation system 100 can generate extract content items up to a threshold number or threshold lineage data size.

Further, as illustrated in FIG. 7, the extract generation system 100 provides an extractor rule agentic tool 708 in the user interface 704. To elaborate, the extract generation system 100 can provide the extractor rule agentic tool 708 that is configured to receive user inputs (e.g., natural language text inputs) that define how and when to generate extract content items and/or what extract content items may or must be generated. As an example, a user of the client device 702 can input text into the extractor rule agentic tool 708 that directs, "From now on, generate extract content items in this way: . . . ," upon which specific directions from the user may be input.

As illustrated in FIG. 7, the extract generation system 100 performs an act 710 of modifying one or more parameters of one or more extractor models 712. In particular, in response to an input associated with the one or more extractor rules 706 and/or the extractor rule agentic tool 708, the extract generation system 100 can perform the act 710 so that the one or more extractor models 712 generate extract content items as defined by the user input(s). Accordingly, the extract generation system 100 can dynamically adapt the behavior of the one or more extractor models 712 in response to changing extraction conditions, user preferences, and/or system-defined optimization criteria.

Figure 8:
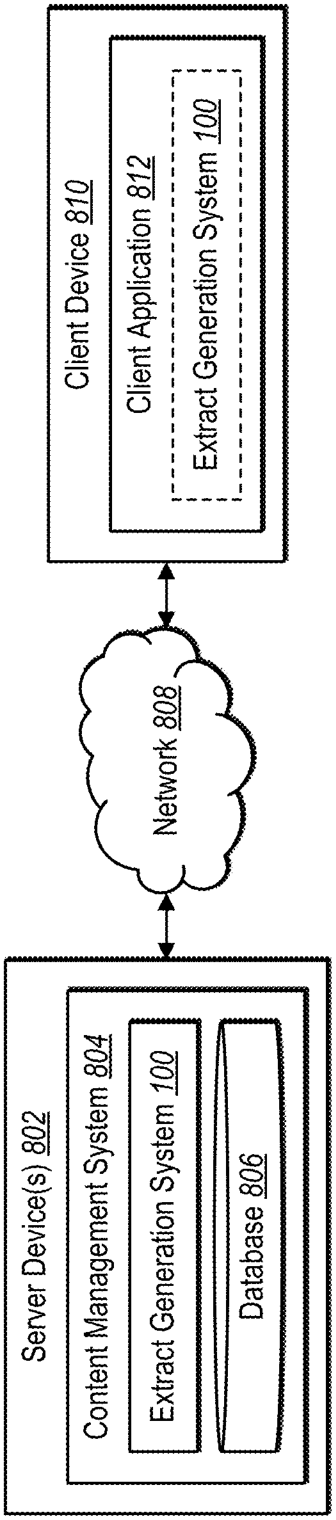
FIG. 8 illustrates a diagram of an example environment in which an extract generation system can operate in accordance with one or more embodiments.

In some embodiments, the extract generation system 100 is part of a networking environment. In particular, the extract generation system 100 is part of a content management system hosted on a distributed networking environment that includes servers and devices communicating one or more a computer networks. For example, FIG. 8 illustrates a diagram of an example environment in which the extract generation system 100 can operate in accordance with one or more embodiments.

As shown, the environment includes server device(s) 802, client device 810, and a network 808. Each of the components of the environment can communicate via the network 808, and the network 808 may be any suitable network over which computing devices can communicate. Example networks are discussed in more detail below in relation to FIGS. 10-11.

As mentioned above, the example environment includes a client device 810. The client device 810 can be one of a variety of computing devices, including a smartphone, a tablet, a smart television, a desktop computer, a laptop computer, a virtual reality device, an augmented reality device, or another computing device as described in relation to FIGS. 10-11. The client device 810 can communicate with the server device(s) 802 via the network 808. For example, the client device 810 can receive user input from a user interacting with the client device 810 (e.g., via the client application 812) to, for instance, access, generate, modify, or share a content item, to collaborate with a co-user of a different client device, or to select a graphical user interface element. In addition, the extract generation system 100 on the server device(s) 802 can receive information relating to various interactions with content items and/or graphical user interface elements based on the input received by the client device 810 (e.g., to define one or more extractor rules and/or to manage one or more components of one or more hierarchical extract structures).

As shown, the client device 810 can include a client application 812. In particular, the client application 812 may be a web application, a native application installed on the client device 810 (e.g., a mobile application, a desktop application, etc.), or a cloud-based application where all or part of the functionality is performed by the server device(s) 802. Based on instructions from the client application 812, the client device 810 can present or display information, including one or more user interfaces for defining one or more extractor rules and/or for viewing and/or managing one or more components of one or more hierarchical extract structures.

As illustrated in FIG. 8, the example environment also includes the server device(s) 802. The server device(s) 802 may generate, track, store, process, receive, and transmit electronic data, such as content items, extract content items, extract metadata, hierarchical extract structures or individual components or a subset of components thereof, interface elements, interactions with and changes or modifications to content items or extract content items, interactions with interface elements, and/or interactions between user accounts and/or client devices. For example, the server device(s) 802 may receive data from the client device 810 in the form of user interactions with interface elements and/or digital data for providing client device 810 with the ability to define one or more extractor rules and/or to view and/or manage one or more components of one or more hierarchical extract structures. In addition, the server device(s) 802 can transmit data to the client device 810 for providing the client device 810 with the ability to define one or more extractor rules and/or to view and/or manage one or more components of one or more hierarchical extract structures. Indeed, the server device(s) 802 can communicate with the client device 810 to send and/or receive data via the network 808. In some implementations, the server device(s) 802 comprise(s) a distributed server where the server device(s) 802 include(s) a number of server devices distributed across the network 808 and located in different physical locations. The server device(s) 802 can comprise one or more content servers, application servers, communication servers, web-hosting servers, machine learning servers, and other types of servers.

As shown in FIG. 8, the server device(s) 802 can also include the extract generation system 100 as part of a content management system 804. The content management system 804 can communicate with the client device 810 to perform various functions associated with the client application 812 such as managing user accounts, managing content collections, managing content items, managing extract content items, managing extract metadata, managing hierarchical extract structures or individual components or a subset of components thereof, and facilitating user interaction with the content collections, content items, extract content items, extract metadata, and/or the hierarchical extract structures or individual components or a subset of components thereof. Indeed, the content management system 804 can include a network-based smart cloud storage system to manage, store, and maintain content items and/or extract content items and related data (e.g., extract metadata) across numerous user accounts, including user accounts in collaboration with one another. In some embodiments, the extract generation system 100 and/or the content management system 804 utilize a database 806 to store and access information such as content items, extract content items, extract metadata, hierarchical extract structures or individual components or a subset of components thereof, and/or user account behavior data.

Although FIG. 8 depicts the extract generation system 100 located on the server device(s) 802, in some implementations, the extract generation system 100 may be implemented by (e.g., located entirely or in part on) one or more other components of the environment. For example, the extract generation system 100 may be implemented by the client device 810 and/or a third-party device. For example, the client device 810 can download all or part of the extract generation system 100 for implementation independent of, or together with, the server device(s) 802.

In some implementations, though not illustrated in FIG. 8, the environment may have a different arrangement of components and/or may have a different number or set of components altogether. For example, the client device 810 may communicate directly with the extract generation system 100, bypassing the network 808. As another example, the environment can include the database 806 located external to the server device(s) 802 (e.g., in communication via the network 808) or located on the server device(s) 802, on a third-party system, and/or on the client device 810. As yet another example, the environment can include a third-party server hosting a large language model in communication with the extract generation system 100.

Figure 9:
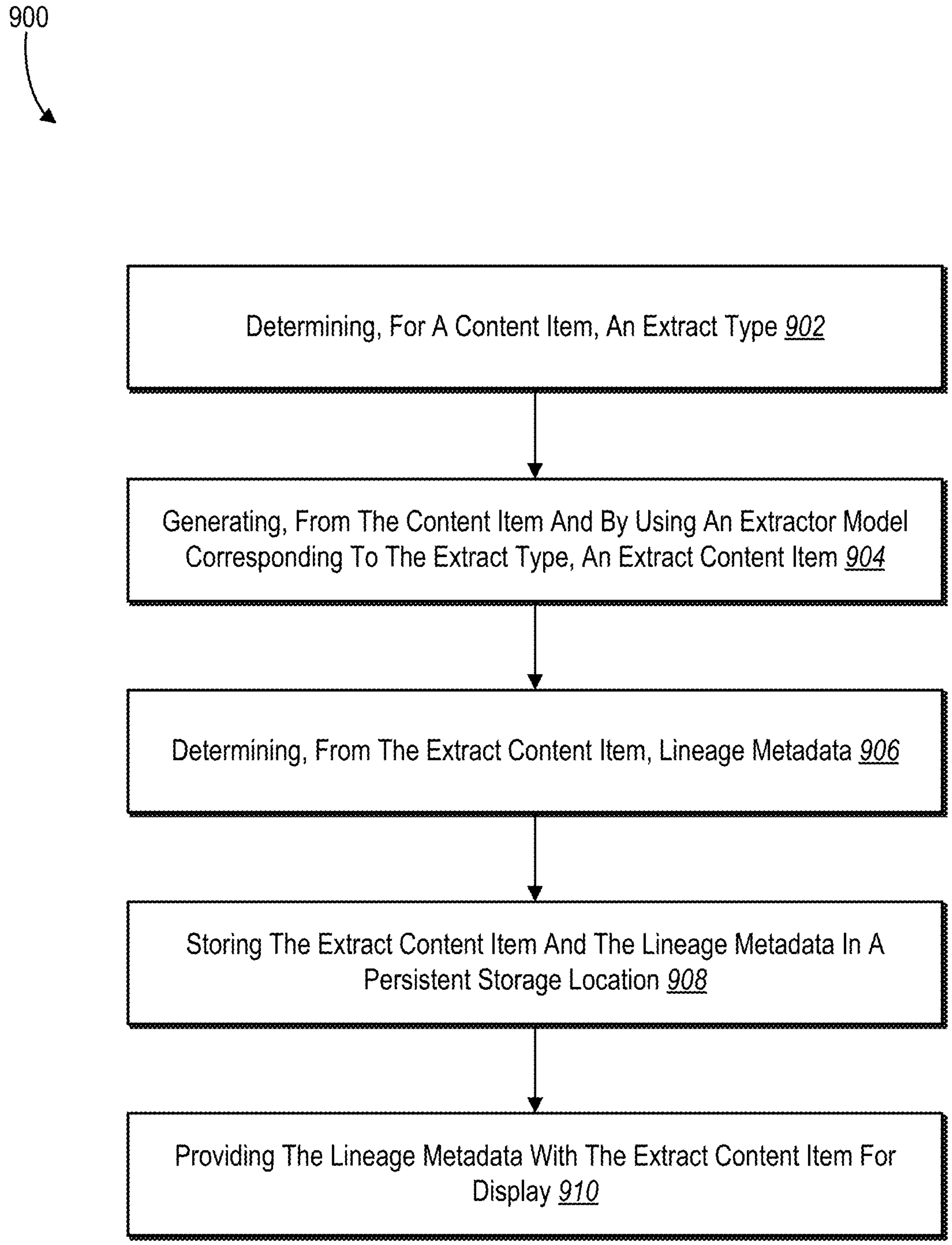
FIG. 9 illustrates an example flowchart of a series of acts for providing lineage metadata with an extract content item for display on a client device in accordance with one or more embodiments.

FIGS. 1-8, the corresponding text, and the examples provide a number of different systems and methods for generating extract content items, determining lineage metadata, and/or providing the lineage metadata with the extract content item for display. In addition to the foregoing, implementations can also be described in terms of flowcharts comprising acts steps in a method for accomplishing a particular result. For example, FIG. 9 illustrates an example flowchart of a series of acts for executing one or more processes for generating extract content items, determining lineage metadata, and/or providing the lineage metadata with the extract content item for display in accordance with one or more embodiments. While FIG. 9 illustrates acts according to certain implementations, alternative implementations may omit, add to, reorder, and/or modify any of the acts shown in FIG. 9. The acts of FIG. 9 can be performed as part of a method (e.g., a computer-implemented method). Alternatively, a non-transitory computer readable medium can comprise instructions that, when executed by one or more processors, cause a computing device to perform the acts of FIG. 9. In still further implementations, a system can perform the acts of FIG. 9.

As illustrated in FIG. 9, the series of acts 900 may include an act 902 of determining, for a content item, an extract type. In particular, the act 902 involves determining, for a content item stored at a content management system, an extract type corresponding to the content item.

The series of acts 900 can also include an act 904 of generating, from the content item and by using an extractor model corresponding to the extract type, an extract content item. In particular, the act 904 can involve generating, from the content item and by using an extractor model corresponding to the extract type, an extract content item based on digital content of the content item.

In addition, the series of acts 900 can include an act 906 of determining, from the extract content item, lineage metadata. In particular, the act 906 can involve determining, from the extract content item, lineage metadata indicating extract lineage from the content item to the extract content item.

Further, the series of acts 900 can include an act 908 of storing the extract content item and the lineage metadata in a persistent storage location. In particular, the act 908 can involve storing the extract content item and the lineage metadata in a persistent storage location within the content management system.

Moreover, the series of acts 900 can include an act 910 of providing the lineage metadata with the extract content item for display. In particular, the act 910 can involve providing the lineage metadata with the extract content item for display on a client device associated with the content management system. In at least one embodiment, the series of acts 900 can include acts to perform any of the operations described in the following clauses:

Clause 1. A computer-implemented method comprising: determining, for a content item stored at a content management system, an extract type corresponding to the content item; generating, from the content item and by using an extractor model corresponding to the extract type, an extract content item based on digital content of the content item; determining, from the extract content item, lineage metadata indicating extract lineage from the content item to the extract content item; storing the extract content item and the lineage metadata in a persistent storage location within the content management system; and providing the lineage metadata with the extract content item for display on a client device associated with the content management system.

Clause 2. The computer-implemented method of clause 1, further comprising generating, based on the lineage metadata of the extract content item, a hierarchical extract structure comprising the content item and the extract content item by: generating a first layer of the hierarchical extract structure for the content item; generating a second layer of the hierarchical extract structure for the extract content item; and associating the first layer with the second layer based on the lineage metadata.

Clause 3. The computer-implemented method as in clause 1 or 2, further comprising: generating, from the extract content item and by using an additional extractor model corresponding to an additional extract type of the extract content item, an additional extract content item based on digital content of the extract content item; and determining, from the additional extract content item, additional lineage metadata indicating extract lineage from the extract content item to the additional extract content item.

Clause 4. The computer-implemented method as in any of clauses 1 to 3, further comprising generating an expanded hierarchical extract structure comprising the content item, the extract content item, and the additional extract content item by: generating an additional layer for the additional extract content item; and associating the first layer and the second layer with the additional layer based on the additional lineage metadata.

Clause 5. The computer-implemented method as in any of clauses 1 to 4, further comprising: in response to receiving a user query from the client device, providing the expanded hierarchical extract structure to a lineage analysis model; determining, utilizing the lineage analysis model, that at least one of the extract content item or the additional extract content item satisfies a relevance threshold to the user query; and generating, utilizing the lineage analysis model, a generative response to the user query based on the at least one of the extract content item or the additional extract content item that satisfies the relevance threshold.

Clause 6. The computer-implemented method as in any of clauses 1 to 5, further comprising: determining that additional extraction from the extract content item is possible; and based on determining that additional extraction is possible, recursively expanding, starting from the extract content item, the extract lineage to include one or more additional extract content items at respective generations with extract types that are increasingly primitive until reaching a threshold primitive level.

Clause 7. The computer-implemented method as in any of clauses 1 to 6, further comprising: monitoring the content management system utilizing a detector model to detect a modification to the content item; and generating a modified extract content item that reflects the modification to the content item.

In some embodiments, the series of acts 900 includes acts to perform any of the operations described in the following clauses:

Clause 8. A system comprising: at least one processor; and at least one non-transitory computer-readable storage medium storing instructions that, when executed by the at least one processor, cause the system to: determine, for a content item detected in a content management system utilizing a detector model, an extract type corresponding to the content item by using an extract categorizer; generate, from the content item and by using an extractor model corresponding to the extract type, an extract content item based on digital content of the content item; determine, from the extract content item, lineage metadata indicating extract lineage from the content item to the extract content item; store the extract content item and the lineage metadata in a persistent storage location within the content management system; and provide the lineage metadata with the extract content item for display on a client device associated with the content management system.

Clause 9. The system of clause 8, further comprising instructions that, when executed by the at least one processor, cause the system to: provide, for display in the client device, one or more elements selectable to define one or more extractor rules for managing generation of the extract content item; and in response to an interaction with an element of the one or more elements, select an extract type for the extract content item from a plurality of extract types.

Clause 10. The system as in clause 8 or 9, further comprising instructions that, when executed by the at least one processor, cause the system to synchronize, utilizing the persistent storage location, the extract content item between client devices associated with one or more user accounts of the content management system.

Clause 11. The system as in any of clauses 8 to 10, further comprising instructions that, when executed by the at least one processor, cause the system to provide, for display in the client device, one or more elements selectable to hide visualization of the extract content item.

Clause 12. The system as in any of clauses 8 to 11, further comprising instructions that, when executed by the at least one processor, cause the system to: monitor the content management system utilizing a detector model to detect a modification to the extract content item; and modify one or more parameters of the extractor model based on the modification to the extract content item.

Clause 13. The system as in any of clauses 8 to 12, further comprising instructions that, when executed by the at least one processor, cause the system to: determine one or more data governance rules associated with the content item, the one or more data governance rules comprising at least one of a permission rule or a retention rule; and in response to generating the extract content item, associating the one or more data governance rules with the extract content item.

Clause 14. The system as in any of clauses 8 to 13, further comprising instructions that, when executed by the at least one processor, cause the system to identify the content item from connector data extracted from a software connector associated with the content management system, wherein the software connector is configured to interface with one or more data sources external to the content management system.

In some cases, the series of acts 900 includes acts to perform any of the operations described in the following clauses:

Clause 15. A non-transitory computer-readable medium storing instructions that, when executed by at least one processor, cause a computing device to: determine, for a content item stored at a content management system, an extract type corresponding to the content item; generate, from the content item and by using an extractor model corresponding to the extract type, an extract content item based on digital content of the content item; determine, from the extract content item, lineage metadata indicating extract lineage from the content item to the extract content item; store the extract content item and the lineage metadata in a persistent storage location within the content management system; and provide a hierarchical extract structure comprising the lineage metadata with the extract content item and the content item for display on a client device associated with the content management system.

Clause 16. The non-transitory computer-readable medium of clause 15, further comprising instructions that, when executed by the at least one processor, cause the computing device to: determine that additional extraction from the extract content item is possible; and based on determining that additional extraction is possible, generate an expanded extract lineage by recursively expanding, starting from the extract content item, the extract lineage to include one or more additional extract content items at respective generations with extract types that are increasingly primitive until reaching a threshold primitive level.

Clause 17. The non-transitory computer-readable medium as in clause 15 or 16, further comprising instructions that, when executed by the at least one processor, cause the computing device to: determine that the content item is relevant to a user query received from a client device; upon determining that the content item is relevant to the user query, identify, based on an analysis of the content item, extract content item, and the one or more additional extract content items, at least one extract content item to utilize in generating a generative response to the user query instead of the content item; and generate, utilizing a generative model, the generative response to the user query utilizing the at least one extract content item.

Clause 18. The non-transitory computer-readable medium as in any of clauses 15 to 17, wherein generating the generative response to the user query further comprises: generating an expanded hierarchical extract structure comprising the one or more additional extract content items and additional lineage metadata determined from the one or more additional extract content items; identifying the at least one extract content item to utilize in generating the generative response by analyzing the expanded hierarchical extract structure; and providing the at least one extract content item to the generative model.

Clause 19. The non-transitory computer-readable medium as in any of clauses 15 to 18, wherein generating the generative response to the user query further comprises: generating an expanded hierarchical extract structure comprising the one or more additional extract content items and additional lineage metadata determined from the one or more additional extract content items; providing the expanded hierarchical extract structure to the generative model, wherein the generative model comprises a lineage analysis machine learning model; and identifying the at least one extract content item to utilize in generating the generative response by utilizing the generative model to analyze the expanded hierarchical extract structure.

Clause 20. The non-transitory computer-readable medium as in any of clauses 15 to 19, further comprising instructions that, when executed by the at least one processor, cause the computing device to store the extract content item, the one or more additional extract content items, and expanded lineage metadata associated with the expanded extract lineage in a shared extract lineage folder within the persistent storage location.

Figure 10:
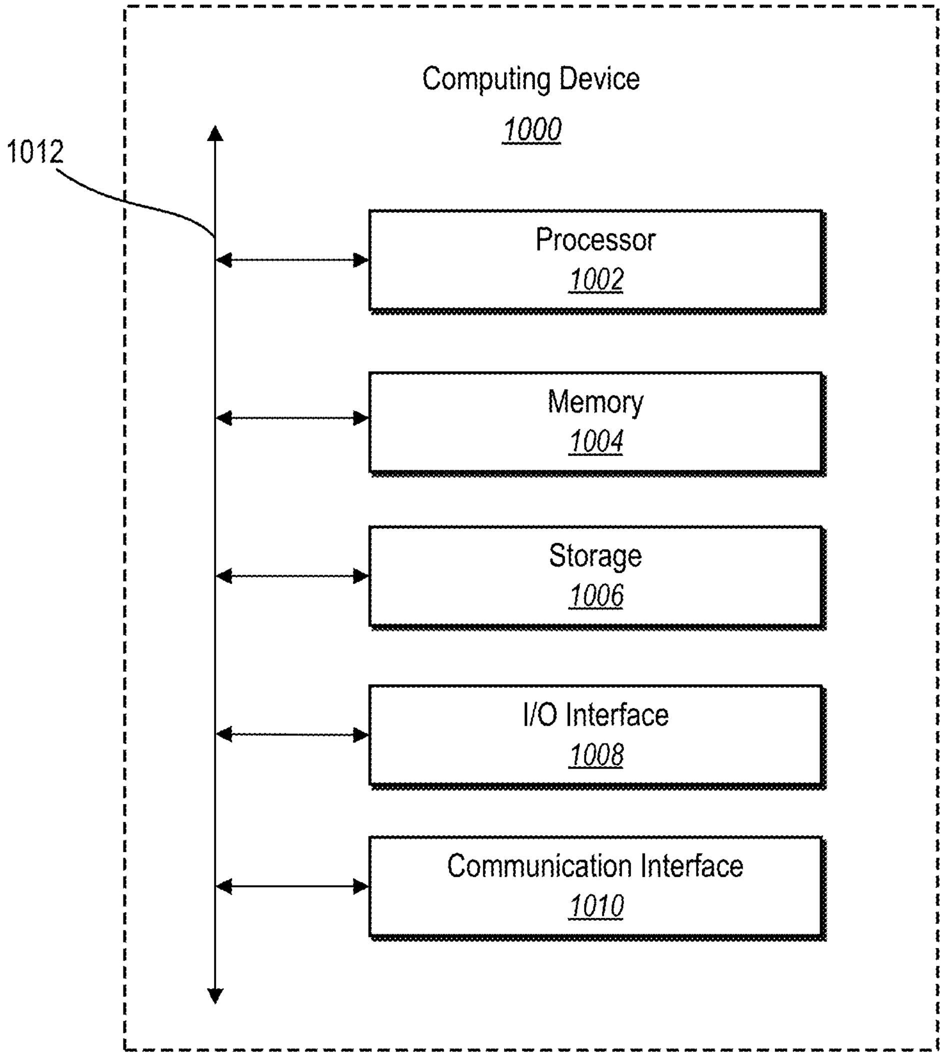
FIG. 10 illustrates a block diagram of an exemplary computing device in accordance with one or more embodiments.

FIG. 10 illustrates a block diagram of an example computing device 1000 (e.g., the server device(s) 802 and/or the client device 810) that may be configured to perform one or more of the processes described above. One will appreciate that server device(s) 802 and/or the client device 810 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an example of computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
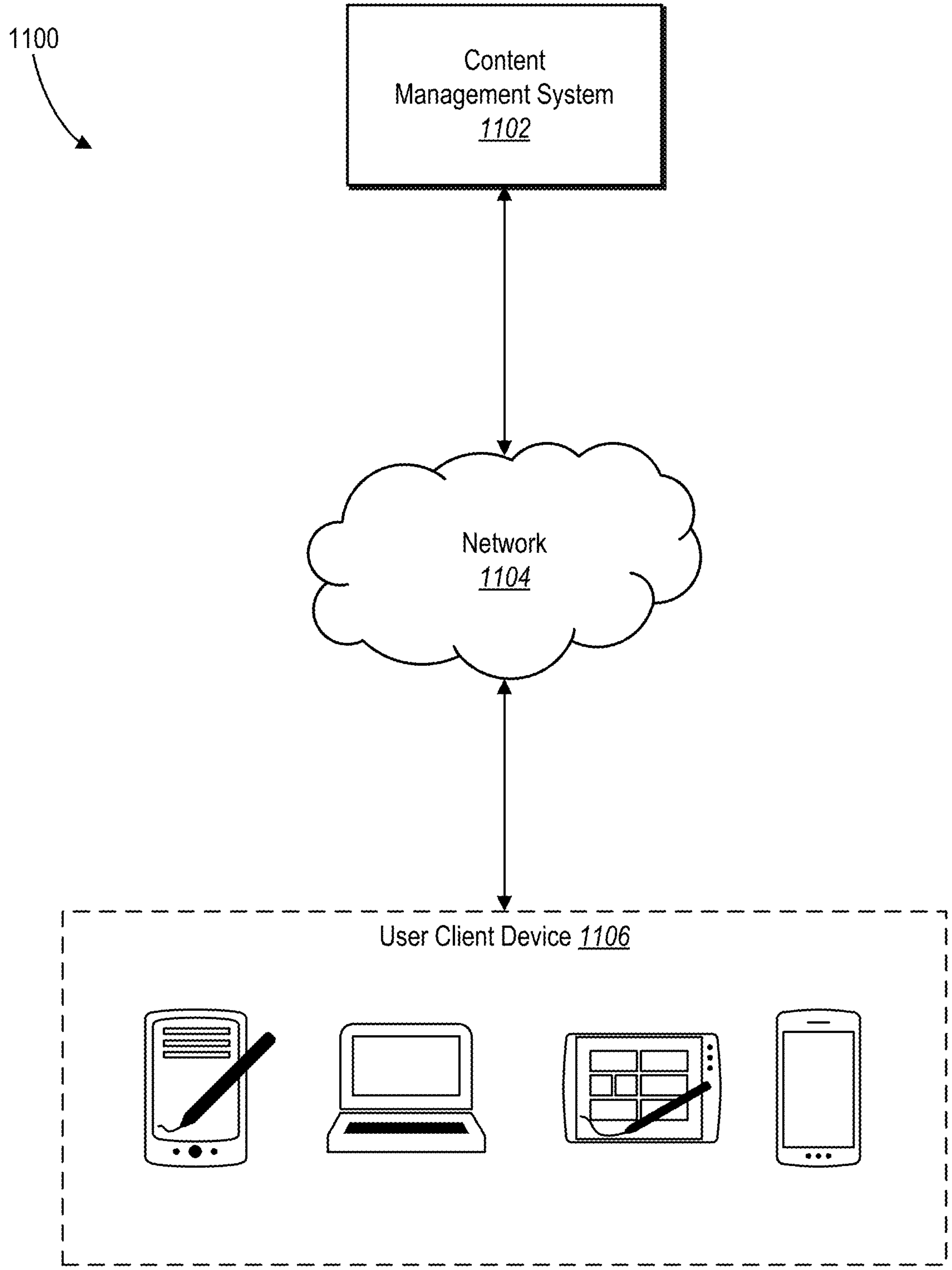
FIG. 11 illustrates an example environment of a networking system including the extract generation system in accordance with one or more embodiments.

FIG. 11 is a schematic diagram illustrating environment 1100 within which one or more implementations of the extract generation system 100 can be implemented. For example, the extract generation system 100 may be part of a content management system 1102 (e.g., the content management system 804). Content management system 1102 may generate, store, manage, receive, and send digital content (such as digital content items). For example, content management system 1102 may send and receive digital content to and from client device 1106 and/or other client devices by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device 1106 and/or other client devices may access content management system 1102.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, for a content item stored at a content management system, an extract type corresponding to the content item;

generating, from the content item and by using an extractor model corresponding to the extract type, an extract content item based on digital content of the content item;

determining, from the extract content item, lineage metadata comprising metadata that defines extract lineage through a traceable chain of inheritance indicating how the extract content item is generated from the content item;

storing the extract content item and the lineage metadata in a shared extract lineage folder within a persistent storage location within the content management system; and providing, from the shared extract lineage folder within the persistent storage location, the lineage metadata with the extract content item for display on a client device associated with the content management system.

2. The computer-implemented method of claim 1, further comprising generating, based on the lineage metadata of the extract content item, a hierarchical extract structure comprising the content item and the extract content item by:

generating a first layer of the hierarchical extract structure for the content item;

generating a second layer of the hierarchical extract structure for the extract content item; and associating the first layer with the second layer based on the lineage metadata.

3. The computer-implemented method of claim 2, further comprising:

generating, from the extract content item and by using an additional extractor model corresponding to an additional extract type of the extract content item, an additional extract content item based on digital content of the extract content item; and determining, from the additional extract content item, additional lineage metadata comprising metadata that defines extract lineage through a traceable chain of inheritance indicating how the additional extract content item is generated from the extract content item.

4. The computer-implemented method of claim 3, further comprising generating an expanded hierarchical extract structure comprising the content item, the extract content item, and the additional extract content item by:

generating an additional layer for the additional extract content item; and associating the first layer and the second layer with the additional layer based on the additional lineage metadata.

5. The computer-implemented method of claim 4, further comprising:

in response to receiving a user query from the client device, providing the expanded hierarchical extract structure to a lineage analysis model;

determining, utilizing the lineage analysis model, that at least one of the extract content item or the additional extract content item satisfies a relevance threshold to the user query; and generating, utilizing the lineage analysis model, a generative response to the user query based on the at least one of the extract content item or the additional extract content item that satisfies the relevance threshold.

6. The computer-implemented method of claim 1, further comprising:

determining that additional extraction from the extract content item is possible; and based on determining that additional extraction is possible, recursively expanding, starting from the extract content item, the extract lineage to include one or more additional extract content items at respective generations with extract types that are increasingly primitive until reaching a threshold primitive level.

7. The computer-implemented method of claim 1, further comprising:

monitoring the content management system utilizing a detector model to detect a modification to the content item; and generating a modified extract content item that reflects the modification to the content item.

8. A system comprising:

at least one processor; and at least one non-transitory computer-readable storage medium storing instructions that, when executed by the at least one processor, cause the system to:

determine, for a content item detected in a content management system utilizing a detector model, an extract type corresponding to the content item by using an extract categorizer;

generate, from the content item and by using an extractor model corresponding to the extract type, an extract content item based on digital content of the content item;

determine, from the extract content item, lineage metadata comprising metadata that defines extract lineage through a traceable chain of inheritance indicating how the extract content item is generated from the content item;

store the extract content item and the lineage metadata in a shared extract lineage folder within a persistent storage location within the content management system; and provide, from the shared extract lineage folder within the persistent storage location, the lineage metadata with the extract content item for display on a client device associated with the content management system.

9. The system of claim 8, further comprising instructions that, when executed by the at least one processor, cause the system to:

provide, for display in the client device, one or more elements selectable to define one or more extractor rules for managing generation of the extract content item; and in response to an interaction with an element of the one or more elements, select an extract type for the extract content item from a plurality of extract types.

10. The system of claim 8, further comprising instructions that, when executed by the at least one processor, cause the system to synchronize, utilizing the persistent storage location, the extract content item between client devices associated with one or more user accounts of the content management system.

11. The system of claim 8, further comprising instructions that, when executed by the at least one processor, cause the system to provide, for display in the client device, one or more elements selectable to hide visualization of the extract content item.

12. The system of claim 8, further comprising instructions that, when executed by the at least one processor, cause the system to:

monitor the content management system utilizing a detector model to detect a modification to the extract content item; and modify one or more parameters of the extractor model based on the modification to the extract content item.

13. The system of claim 8, further comprising instructions that, when executed by the at least one processor, cause the system to:

determine one or more data governance rules associated with the content item, the one or more data governance rules comprising at least one of a permission rule or a retention rule; and in response to generating the extract content item, associating the one or more data governance rules with the extract content item.

14. The system of claim 8, further comprising instructions that, when executed by the at least one processor, cause the system to identify the content item from connector data extracted from a software connector associated with the content management system, wherein the software connector is configured to interface with one or more data sources external to the content management system.

15. A non-transitory computer-readable medium storing instructions that, when executed by at least one processor, cause a computing device to:

determine, for a content item stored at a content management system, an extract type corresponding to the content item;

generate, from the content item and by using an extractor model corresponding to the extract type, an extract content item based on digital content of the content item;

determine, from the extract content item, lineage metadata comprising metadata that defines extract lineage through a traceable chain of inheritance indicating how the extract content item is generated from the content item;

store the extract content item and the lineage metadata in a shared extract lineage folder within a persistent storage location within the content management system; and provide, from the shared extract lineage folder within the persistent storage location, a hierarchical extract structure comprising the lineage metadata with the extract content item and the content item for display on a client device associated with the content management system.

16. The non-transitory computer-readable medium of claim 15, further comprising instructions that, when executed by the at least one processor, cause the computing device to:

determine that additional extraction from the extract content item is possible; and based on determining that additional extraction is possible, generate an expanded extract lineage by recursively expanding, starting from the extract content item, the extract lineage to include one or more additional extract content items at respective generations with extract types that are increasingly primitive until reaching a threshold primitive level.

17. The non-transitory computer-readable medium of claim 16, further comprising instructions that, when executed by the at least one processor, cause the computing device to:

determine that the content item is relevant to a user query received from a client device;

upon determining that the content item is relevant to the user query, identify, based on an analysis of the content item, extract content item, and the one or more additional extract content items, at least one extract content item to utilize in generating a generative response to the user query instead of the content item; and generate, utilizing a generative model, the generative response to the user query utilizing the at least one extract content item.

18. The non-transitory computer-readable medium of claim 17, wherein generating the generative response to the user query further comprises:

generating an expanded hierarchical extract structure comprising the one or more additional extract content items and additional lineage metadata determined from the one or more additional extract content items;

identifying the at least one extract content item to utilize in generating the generative response by analyzing the expanded hierarchical extract structure; and providing the at least one extract content item to the generative model.

19. The non-transitory computer-readable medium of claim 17, wherein generating the generative response to the user query further comprises:

generating an expanded hierarchical extract structure comprising the one or more additional extract content items and additional lineage metadata determined from the one or more additional extract content items;

providing the expanded hierarchical extract structure to the generative model, wherein the generative model comprises a lineage analysis machine learning model; and identifying the at least one extract content item to utilize in generating the generative response by utilizing the generative model to analyze the expanded hierarchical extract structure.

20. The non-transitory computer-readable medium of claim 16, further comprising instructions that, when executed by the at least one processor, cause the computing device to store the extract content item, the one or more additional extract content items, and expanded lineage metadata associated with the expanded extract lineage in a shared extract lineage folder within the persistent storage location.

* * * * *